(12) United States Patent
Thonangi

(10) Patent No.: US 7,801,924 B2
(45) Date of Patent: Sep. 21, 2010

(54) DECISION TREE CONSTRUCTION VIA FREQUENT PREDICTIVE ITEMSETS AND BEST ATTRIBUTE SPLITS

(75) Inventor: Risi Vardhan Thonangi, Vizianagaram (IN)

(73) Assignee: Infosys Technologies Ltd., Bangalore (IN)

( * ) Notice: Subject to any disclaimer, the term of this patent is extended or adjusted under 35 U.S.C. 154(b) by 365 days.

(21) Appl. No.: 11/965,692

(22) Filed: Dec. 27, 2007

(65) Prior Publication Data

US 2008/0201340 A1 Aug. 21, 2008

(30) Foreign Application Priority Data

Dec. 28, 2006 (IN) .................. 2442/CHE/2006

(51) Int. Cl.
*G06F 17/30* (2006.01)
*G06F 17/00* (2006.01)

(52) U.S. Cl. ..................................... 707/797
(58) Field of Classification Search ................ 707/778, 707/797
See application file for complete search history.

(56) References Cited

U.S. PATENT DOCUMENTS

| | | | |
|---|---|---|---|
| 5,899,992 A * | 5/1999 | Iyer et al. ................ | 707/7 |
| 6,532,467 B1 | 3/2003 | Brocklebank et al. | |
| 7,016,887 B2 | 3/2006 | Stockfisch | |
| 7,197,504 B1 | 3/2007 | Runkler et al. | |
| 7,269,597 B2 | 9/2007 | Stockfisch | |
| 2002/0087499 A1 | 7/2002 | Stockfisch | |
| 2004/0181553 A1 | 9/2004 | Stockfisch | |
| 2007/0288417 A1 | 12/2007 | Aggarwal et al. | |

OTHER PUBLICATIONS

Liu et al., "A Fast High Utility Itemsets Mining Algorithm", 2005.*
Tan et al., "Introduction to Data Mining", 2006, Addison-Wesley, Chapter 4, pp. 145-204.*
Rokach et al., "Decision Trees", Data Mining and Knowledge Discovery Handbook, 2005, pp. 165-192.*
Kearns et al., A Fast, Bottom-Up Decision Tree Pruning Algorithm with Near-Optimal Generalization, 1998, ATT.*
Agrawal et al., "Mining Association Rules between Sets of Items in Large Databases," *Proceedings of the 1993 ACM SIGMOD Conf. on Management of Data*, pp. 207-216, 1993, 10 pages.
Berzal et al., "ART: A Hybrid Classification Model," *Machine Learning*, vol. 54, No. 1, pp. 67-92, Jan. 2004, 26 pages.
"Decision Tree," Wikipedia, visited Dec. 20, 2007, 4 pages.
Kass, "An Exploratory Technique for Investigating Large Quantities of Categorical Data," *Applied Statistics*, vol. 29, No. 2, pp. 119-127, 1980, 9 pages.
Li et al., CMAR: Accurate and Efficient Classification Rules Based on Multiple Class-Association Rules, *Proceedings of the 2001 IEEE Int'l Conf on Data Mining*, pp. 369-376, 2001, 8 pages.

(Continued)

*Primary Examiner*—James Trujillo
*Assistant Examiner*—Dawaune Conyers
(74) *Attorney, Agent, or Firm*—Klarquist Sparkman, LLP

(57) ABSTRACT

A decision tree can be constructed via frequent predictive itemsets and best item splits. A hierarchical frequent predictive itemsets tree data structure can be used to construct the decision tree. A bottom-up traversal of the data structure can be used during determination of best item splits. The described technologies can construct decision trees with superior accuracy as compared to conventional greedy decision tree construction approaches.

24 Claims, 33 Drawing Sheets

OTHER PUBLICATIONS

Liu et al., "Integrating Classification and Association Rule Mining," *Proceedings of the Fourth ACM SIGKDD Int'l Conf. of Knowledge Discovery and Data Mining*, pp. 80-86, 1998, 7 pages.

Meretakis et al., "Extending Naïve Bayes Classifiers Using Long Itemsets," *Proceedings of the Fifth ACM SIGKDD Int'l Conf. on Knowledge Discovery and Data Mining*, pp. 165-174, 1999, 10 pages.

Nijssen et al., "Mining Optimal Decision Trees from Itemset Lattices," Report CW 476, Dept. of Computer Science, Katholieke Universiteit Leuven, Belgium, from http://www.liacs.nl/~snijssen/complete.pdf, Mar. 2007, 16 pages.

Nijssen et al., "Mining Optimal Decision Trees from Itemset Lattices," *Proceedings of the 13th ACM SIGKDD Int'l Conf. on Knowledge Discovery and Data Mining*, pp. 530-539, Aug. 2007, 10 pages.

Quinlan, "Decision Trees and Instance-Based Classifiers," The Computer Science and Engineering Handbook, Tucker, ed., pp. iv&521-535, 1996, 16 pages.

Quinlan, "C4.5: Programs for Machine Learning," *The Morgan Kaufman Series in Machine Learning*, Morgan Kaufman Publishers, pp. 17-26, 71-94, 1993, 34 pages.

Quinlan, "Induction of Decision Trees," *Machine Learning*, vol. 1, pp. 81-106, 1986, 26 pages.

Shang et al., "Depth-First Frequent Itemset Mining in Relational Databases," *SAC '05*, Mar. 13-17, 2005, 6 pages.

Thonangi et al., "ACME: An Associative Classifier based on Maximum Entropy Principle," *Algorithmic Learning Theory 16th Int'l Conf.*, Lecture Notes in Computer Science, vol. 3734, pp. 122-134, 2005, 13 pages.

Thonangi, "Classifying Categorical Data," Master's Thesis, International Institute of Information Technology, Hyderabad, India, Dec. 2005, 54 pages.

Wang et al., "Growing Decision Trees On Support-Less Association Rules," *Proceedings of the Sixth ACM SIGKDD Int'l Conf. on Knowledge Discovery and Data Mining*, pp. 265-269, 2000, 5 pages.

Yin et al., "Classification based on Predictive Association Rules," *Proceedings of the Third SIAM Int'l Conf. on Data Mining*, pp. 331-335, 2003, 5 pages.

* cited by examiner

|  1520A  |  1520B  |  1520C  |  1530  |
|---|---|---|---|
| DIET | SMOKER | EXERCISE FREQUENCY | HEALTH |
| HEALTHY | N | WEEKLY | GOOD |
| HEALTHY | N | WEEKLY | GOOD |
| HEALTHY | N | WEEKLY | POOR |
| HEALTHY | N | DAILY | GOOD |
| HEALTHY | N | DAILY | GOOD |
| HEALTHY | N | MONTHLY | POOR |
| HEALTHY | Y | DAILY | GOOD |
| HEALTHY | Y | MONTHLY | POOR |
| UNHEALTHY | N | WEEKLY | POOR |
| UNHEALTHY | Y | MONTHLY | GOOD |
| UNHEALTHY | Y | WEEKLY | POOR |
| UNHEALTHY | Y | DAILY | POOR |

| FREQUENT ITEMSET | FREQUENCY | P(GOOD, POOR) |
|---|---|---|
| HEALTHY | 8 | 5:3 | ←—1610
| UNHEALTHY | 4 | 1:3 |
| N | 7 | 4:3 |
| Y | 5 | 2:3 |
| WEEKLY | 5 | 2:3 |
| DAILY | 4 | 3:1 |
| MONTHLY | 3 | 1:2 |
| HEALTHY, N | 6 | 4:2 |
| HEALTHY, Y | 2 | 1:1 |
| UNHEALTHY, Y | 3 | 1:2 |
| HEALTHY, WEEKLY | 3 | 2:1 |
| HEALTHY, DAILY | 3 | 3:0 |
| HEALTHY, MONTHLY | 2 | 0:2 |
| UNHEATHLY, WEEKLY | 2 | 0:2 |
| Y, DAILY | 2 | 1:1 |
| Y, MONTHLY | 2 | 1:1 |
| N, WEEKLY | 4 | 2:2 |
| N, DAILY | 2 | 2:0 |
| HEALTHY, N, WEEKLY | 3 | 2:1 |
| HEATHLY, N, DAILY | 2 | 2:0 |

FIG. 16

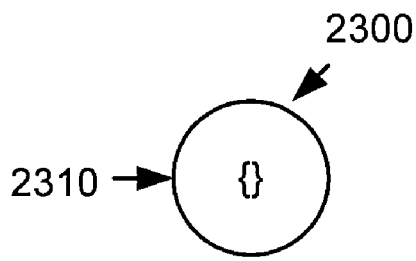
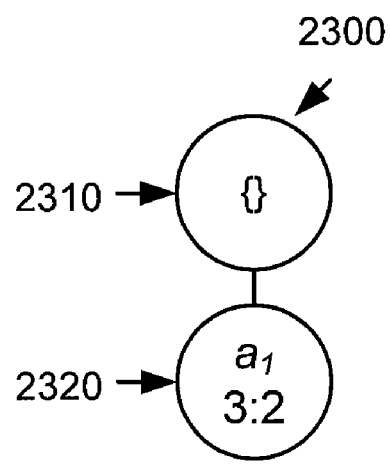
FIG. 23A          FIG. 23B
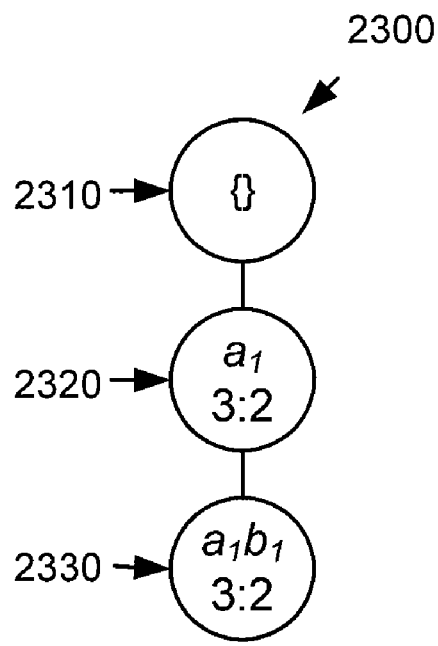
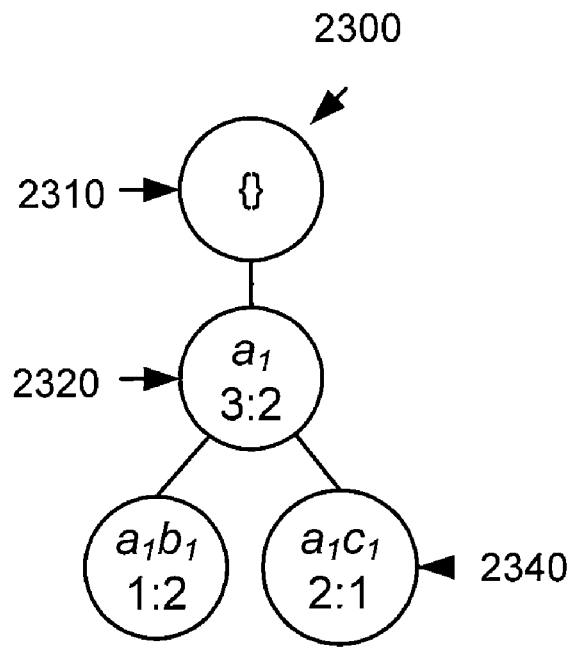
FIG. 23C          FIG. 23D

2600

Find-BestSplits (*Node, Imm-Supersets*)
1. *Node* - A Node of the Prefix Tree
2. *Imm-Supersets* - Nodes corresponding to Immediate Supersets of "*Node*"
    Phase-1:
3.     For-each *child* ∈ *Node:children*[ ]
4.         *Child-Supersets* = {}
5.         For-each *itemset* ∈ *Imm-Supersets*
6.             If *itemset.children[child.item]* exists
7.                 *Child-Supersets* += *itemset.children[child.item]*
8.         For-each *node* ∈ *child.children*[ ]
9.             *Child-Supersets* += *node*
10.        Find-BestSplits (*child, Child-Supersets*)
    Phase-2:
11. Use *Imm-Supersets* to calculate *best-split* at *Node*
12. Store the *best-split* accuracy and attribute in
13.     *Node.accuracy* and *Node.attr* respectively

FIG. 26

DECISION TREE CONSTRUCTION VIA FREQUENT PREDICTIVE ITEMSETS AND BEST ATTRIBUTE SPLITS

BACKGROUND

Data mining can extract useful information from a dataset and has a wide range of applications: fraud detection, business intelligence, medical diagnosis, target marketing and the like. Classification in data mining involves the construction of a model to represent the distribution of a class attribute across transactions in a dataset given a set of predictor attributes in the transactions. For example, data mining could generate a classification model from a dataset of medical records of smokers that represents the distribution of lung diseases (e.g., asthma, emphysema, lung cancer) given certain patient traits (e.g., age, gender, weight, years spent smoking).

Decision trees are one type of classification model and are sometimes favored for use in a data mining environment because they represent information in a manner that is easy to understand. The intuitive representation of classification data offered by decision trees makes them an important analysis tool for understanding relationships between attributes.

Presently, most decision tree construction algorithms build decision trees from a dataset in a breadth-first manner by recursively partitioning the dataset until a high proportion of each partition's transactions belong to one value of the class attribute. These algorithms (e.g., ID3, CART, CHAID) may not generate optimally accurate decision trees because such top-down algorithms assume independence between predictor attributes.

Another classification approach is to classify the dataset based on association rules. Association rules are statistical relationships between sets of item (the various values that attributes in a transaction may assume) in a dataset. The support of an association rule is the probability that all items in the rule exist in the dataset. An association-rule-based classification approach mines all itemsets that satisfy a minimum support and then builds a classification model from these frequent predictive itemsets.

Association-rule-based classifications possess undesirable traits despite their greater accuracy—the ability of a classification model to correctly predict the value of a class attribute for a transaction whose class attribute value is unknown. Association-rule-based classification approaches such as CBA, CMAR, CPAR and Large Itemsets are lazy-learning classifiers; they do not generate a general classification model but instead build query-specific models at run-time. The ACME association-rule-based classification algorithm generates a classification model that is completed in the learning phase, but the model is not as easy to understand as a decision tree. In an ACME-based classification, transactions traverse multiple paths and reach multiple leaves and the final class attribute value is determined by multiplying floating-point values of nodes that are visited by the transaction for each class attribute value and by picking the class attribute value that has the maximum product of the floating-point values.

Although such techniques can be useful, there remains a need for better data mining techniques.

SUMMARY

As described herein, decision trees can be constructed from best attribute splits determined for frequent predictive itemsets mined from a dataset of training transactions. The frequent predictive itemsets can be stored in a frequent predicted itemset tree data structure in which the nodes represent respective frequent predictive itemsets.

The best attribute splits can be determined by traversing the frequent itemset tree data structure in a bottom-up manner and by choosing the attribute split associated with the respective nodes that has the greatest accuracy among the attribute splits associated with the respective nodes. A decision tree can be constructed by choosing a subset of the frequent predictive itemsets based on the determined best attribute splits and generating nodes in the decision tree based on the chosen frequent predictive itemsets.

As described herein, a variety of other features and advantages can be incorporated into the technologies as desired.

The foregoing and other features and advantages will become more apparent from the following detailed description of disclosed embodiments, which proceeds with reference to the accompanying drawings.

BRIEF DESCRIPTION OF THE FIGURES

FIG. 15 depicts an exemplary training dataset.

FIG. 16 depicts the frequent predictive itemsets meeting a support value of 2 mined from the exemplary training dataset of FIG. 15.

FIG. 23 shows the storage of three frequent predictive itemsets from FIG. 22 into a frequent predictive itemsets tree data structure using the exemplary method of FIG. 12.

FIG. 26 shows pseudocode for determining best attribute splits for frequent predictive itemsets stored in a frequent predictive itemset tree.

DETAILED DESCRIPTION

Example 1

Exemplary System for Constructing a Decision Tree

Figure 1:
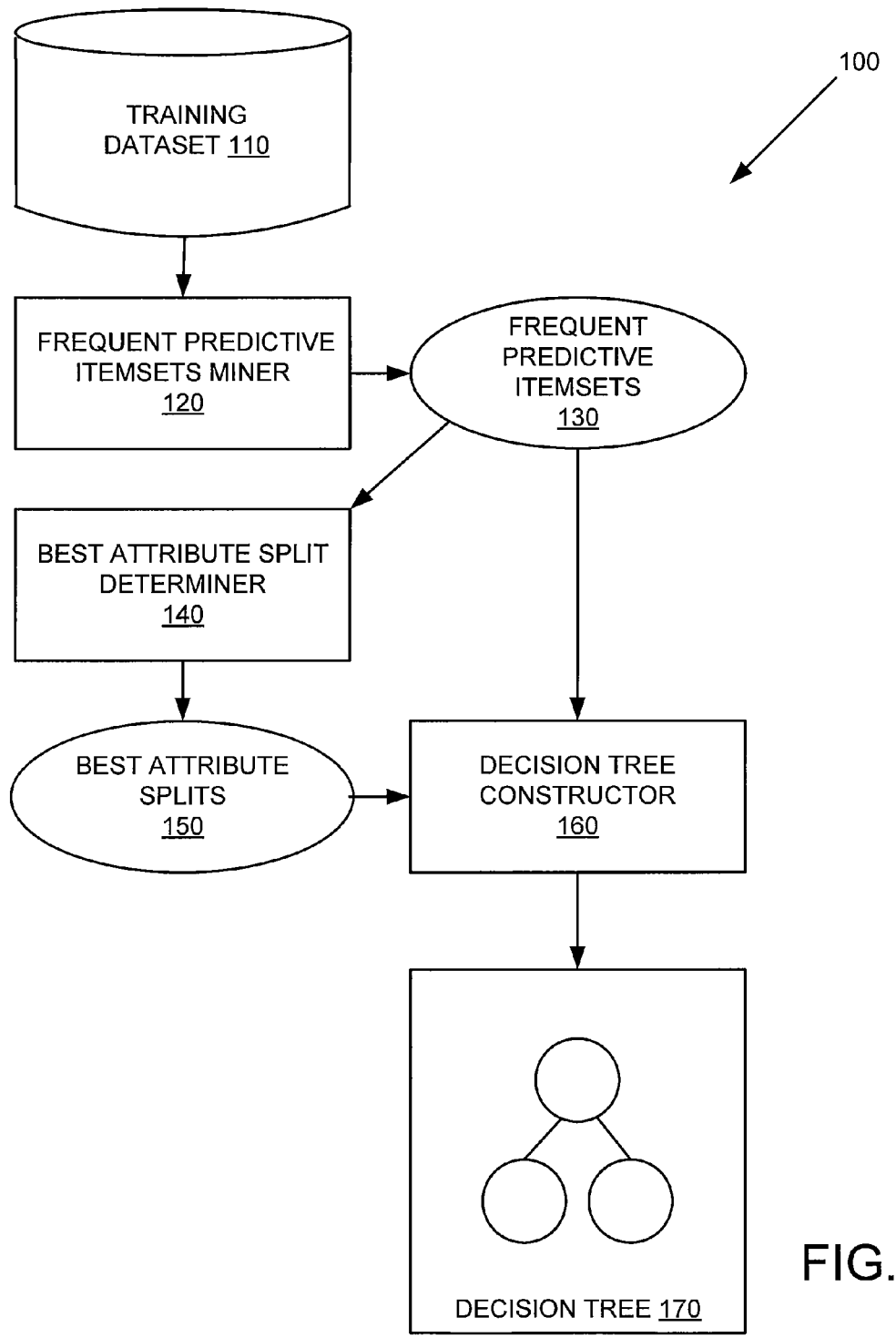
FIG. 1 is a block diagram of an exemplary system for constructing a decision tree via frequent predictive itemsets and best attribute splits.

FIG. 1 is a block diagram of an exemplary system 100 for constructing a decision tree 170 based on best attribute splits 150 determined for frequent predictive itemsets 130 mined from a training dataset 110. The system 100 and variants of it can be used to perform any of the methods described herein.

In the example, a frequent predictive itemset miner 120 is configured to mine the frequent predictive itemsets 130 from the training dataset 110. A best attribute split determiner 140 is configured to determine the best attribute splits 150 for the frequent predictive itemsets 130 (e.g., based on calculated accuracies).

A decision tree constructor 160 is configured to construct the decision tree 170 from the frequent predictive itemsets 130 and the best attribute splits 150. The decision tree 170 can then be used to provide a prediction for a predicted attribute.

As described herein, the frequent predictive itemsets 130 and the best attribute splits 150 can be organized into a single hierarchical tree data structure that can be provided to the decision tree constructor 160. The hierarchical tree data structure can be traversed in a bottom-up manner when determining best attribute splits.

Example 2

Exemplary Method of Constructing a Decision Tree

Figure 2:
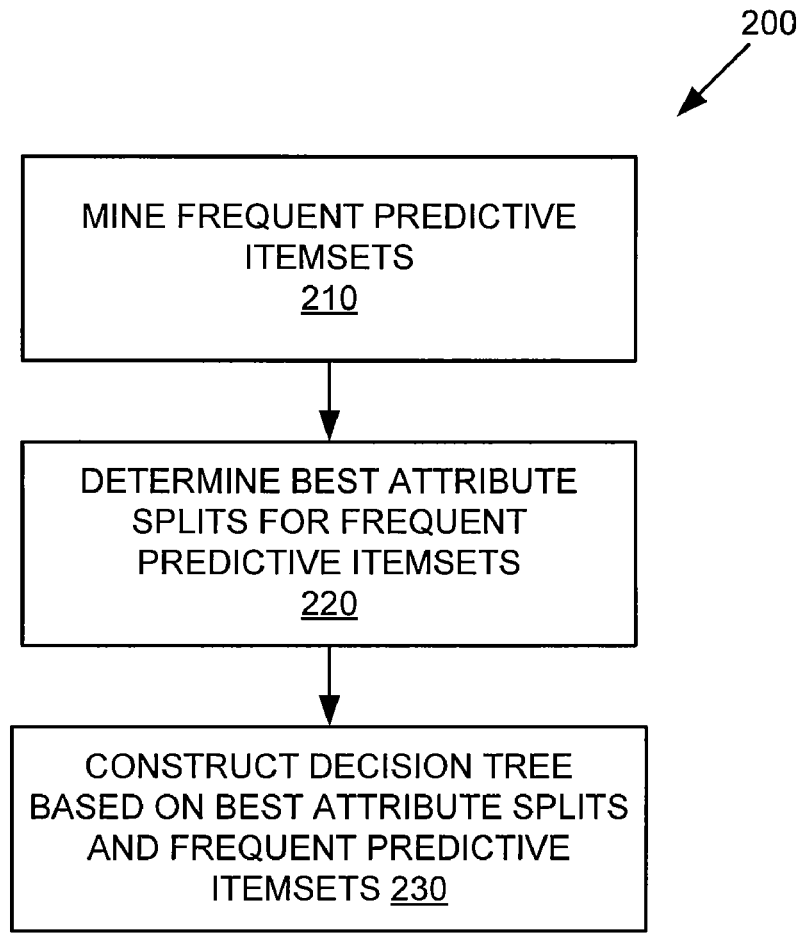
FIG. 2 is a flowchart of an exemplary method of constructing a decision tree via frequent predictive itemsets and best attribute splits.

FIG. 2 is a flowchart of an exemplary method 200 of constructing a decision tree based on best attribute splits determined for frequent predictive itemsets mined from a training dataset.

At 210, frequent predictive itemsets are mined from the training dataset. Subsequently, class distribution values for the frequent predictive itemsets can be calculated. Alternatively, class distribution values can be calculated during the mining. In an implementation using a hierarchical frequent predictive itemsets tree, the class distribution values can be stored at nodes of the tree.

At 220, best attribute splits are determined for the frequent predictive itemsets.

At 230, a decision tree is constructed from the frequent predictive itemsets and the best attribute splits. Such construction can comprise choosing a subset of the frequent predictive itemsets and constructing a decision tree therefrom.

The method 200 and any of the methods described herein can be performed by computer-executable instructions stored in one or more computer-readable media (e.g., storage or other tangible media).

Example 3

Exemplary Prediction System Using Decision Tree

Figure 3:
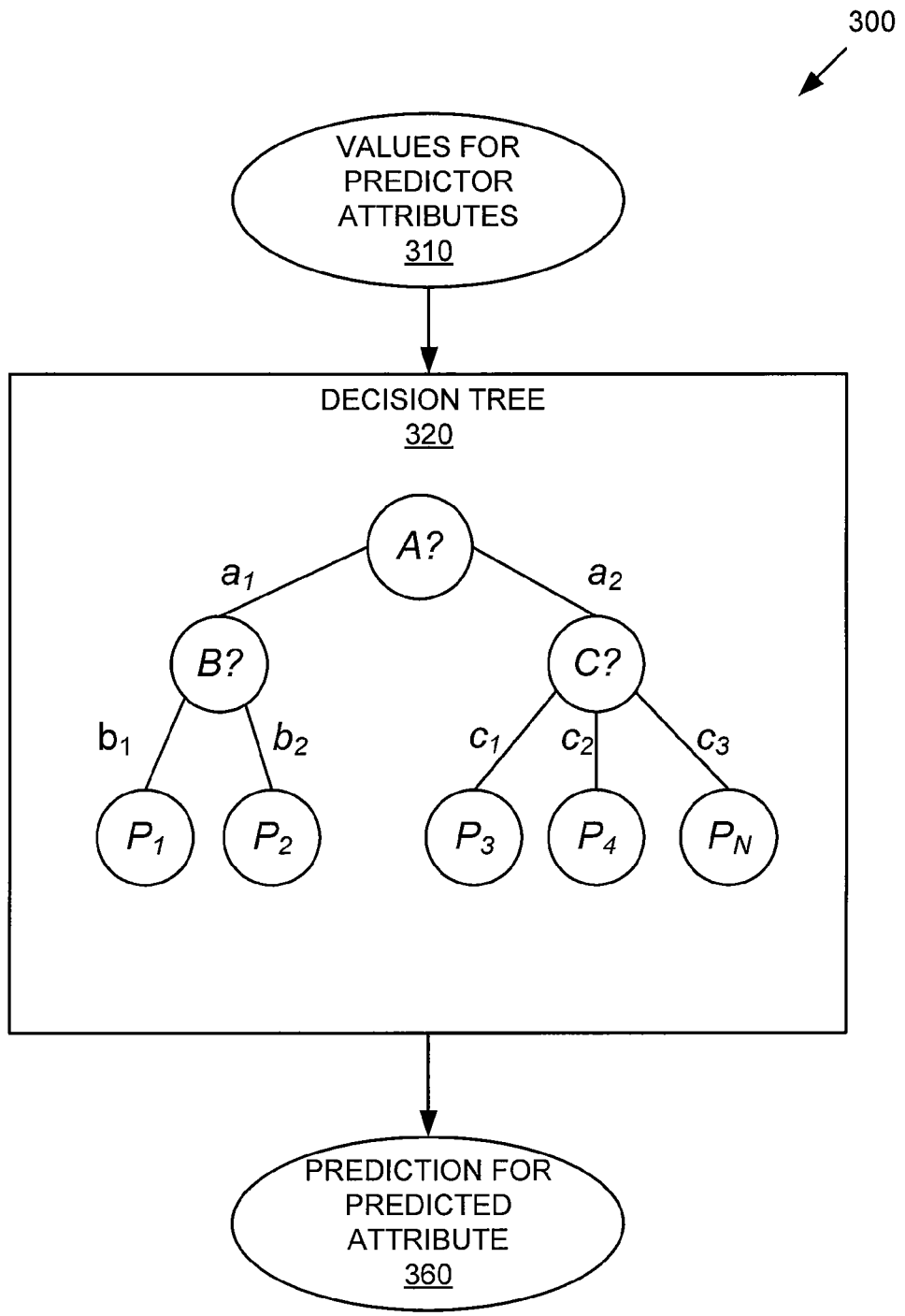
FIG. 3 is a block diagram of an exemplary prediction system using a decision tree.

In any of the examples herein, the generated decision tree can be used in a prediction system configured to generate a prediction for a predicted attribute from one or more predictor attributes. In this way, the decision tree can be said to generate the prediction. FIG. 3 is a block diagram of an exemplary prediction system 300 using a decision tree 320.

In the example, values for predictor attributes 310 are applied to a decision tree 320 to generate a prediction for a predicted attribute 360.

Typically, the decision tree 320 is navigated from the root to the leaves according to the values for the predictor attributes 310. For example, if the predictor attribute A has the value $a_1$ and the predictor attribute B has the value $b_1$, navigation to the node $P_1$ will result. The node can indicate the resulting prediction, which is provided as output 360.

In practice, the decision tree 320 can have more or fewer nodes, and the system 300 can be used to predict one or more other predicted attributes if desired.

Example 4

Exemplary Method of Generating a Prediction Via a Decision Tree

Figure 4:
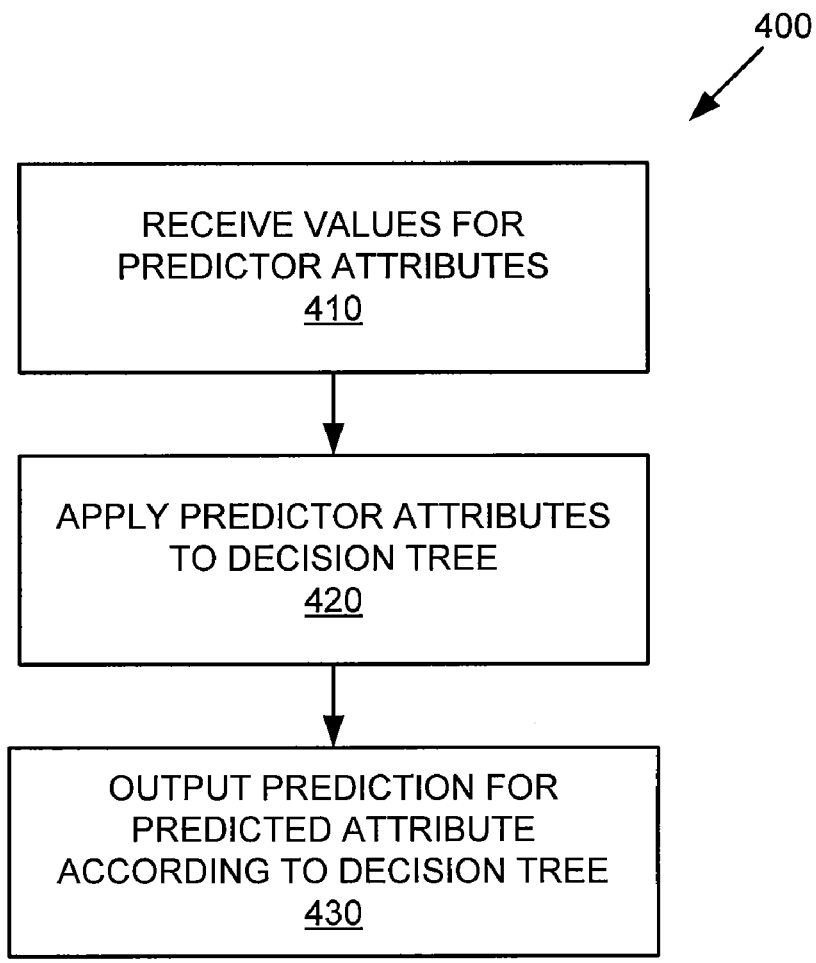
FIG. 4 is a flowchart of an exemplary method of generating a prediction via a decision tree.

FIG. 4 is a flowchart of an exemplary method 400 of generating a prediction via a decision tree. In the example, values for predictor attributes are received at 410. At 420, the values for the predictor attributes are applied to the decision tree (e.g., the tree is navigated until a prediction is indicated).

At 430, the prediction for the predicted attribute is output according to the decision tree (e.g., according to the leaf node indicating a prediction for the predicted attribute).

Example 5

Exemplary Decision Tree

In any of the examples herein, a decision tree classification model, or "decision tree," can be generated. A decision tree can be used to generate a prediction for a predicted attribute for a transaction (e.g., whose class attribute value is unknown) based on values for respective predictor attributes of the transaction.

In practice, the decision tree can be generated using a training dataset and then have transactions to be classified (e.g., live data) applied to it.

Example 6

Exemplary Predicted Attribute

In any of the examples herein, a predicted attribute can be any attribute for which a prediction can be generated by the decision tree. In practice, the attribute can be category-based (e.g., capable of assuming any of a finite number of discrete values). Continuous attribute values can be mapped to discrete attribute values via a discretization operation.

The predicted attribute is sometimes called a "class attribute" herein because a transaction (e.g., having values for the predictor attributes) can be classified by the decision tree into one of a plurality of classes or categories. The predicted attribute can also be called a "target variable."

Example 7

Exemplary Prediction

In any of the examples herein, a prediction output via the decision tree can take a variety of forms. For example, the tree can indicate a single (e.g., most likely) value for the predicted attribute. Alternatively, the prediction can also indicate likelihood (e.g., how likely it is the value will be observed based on observed values in a training dataset). Alternatively, the prediction can indicate a plurality of values having respective likelihood values (e.g., a first value and likelihood, a second value and likelihood, and so on).

The prediction can be described as the probability that a transaction with an unknown class attribute value will have a given class attribute value. Although binary examples are possible and described herein, the technologies are not limited to binary scenarios. The prediction can indicate one out of a plurality of possible attribute values (e.g., categories) for the predicted attribute.

Example 8

Exemplary Predictive Itemsets

In any of the examples herein, predictive itemsets can be analyzed to determine frequent predictive itemsets, which can serve as a basis for the resulting decision tree. A training dataset can have a plurality of transactions. A transaction can be a set of values (e.g., items) for respective attributes (e.g., $A=a_4$, $B=b_3$, $C=c_9$, $Y=y_3$). The predictor attributes are those attributes other than the predicted attribute.

An itemset can be a permutation of items (e.g., values of predictor attributes) appearing in a transaction. A predictive itemset is an itemset for which the transaction has any value for the predicted attribute. The predicted attribute itself is not included in any predictive itemset. The possible predictive itemsets are the various permutations of items appearing in a transaction that has any value for a predicted attribute. For a plurality of transactions, the possible predictive itemsets can be the combined sets of itemsets for the transactions.

Thus, in the above example transaction, if the predicted attribute is Y, possible predictive itemsets include $(a_4)$, $(b_3)$, $(c_9)$, $(a_4, b_3)$, $(a_4, C_9)$, $(b_3, c_9)$, and $(a_4, b_3, c_9)$. The predicted attribute itself is not included in the predictive itemset. As more transactions are added, the number of predictive itemsets typically increases.

Although the predictive itemsets are called "predictive," it is not required that there be a cause-effect or other relationship between the predictive items and the predicted attribute. However, a statistical correlation between the predictive itemsets and the values for the predicted attribute can be analyzed when constructing the resulting decision tree.

Example 9

Exemplary Frequent Predictive Itemsets

In any of the examples herein, the support of an itemset can be the number of transactions in which the items for the itemset appear. So, the support of an itemset $(a_1, b_1)$ can be the number of transactions having both $a_1$ and $b_1$. A frequent predictive itemset, or frequent itemset, can be a predictive itemset having support meeting (e.g., greater than, greater than or equal to, etc.) a support threshold value.

Example 10

Exemplary System for Mining Frequent Predictive Itemsets

Figure 5:
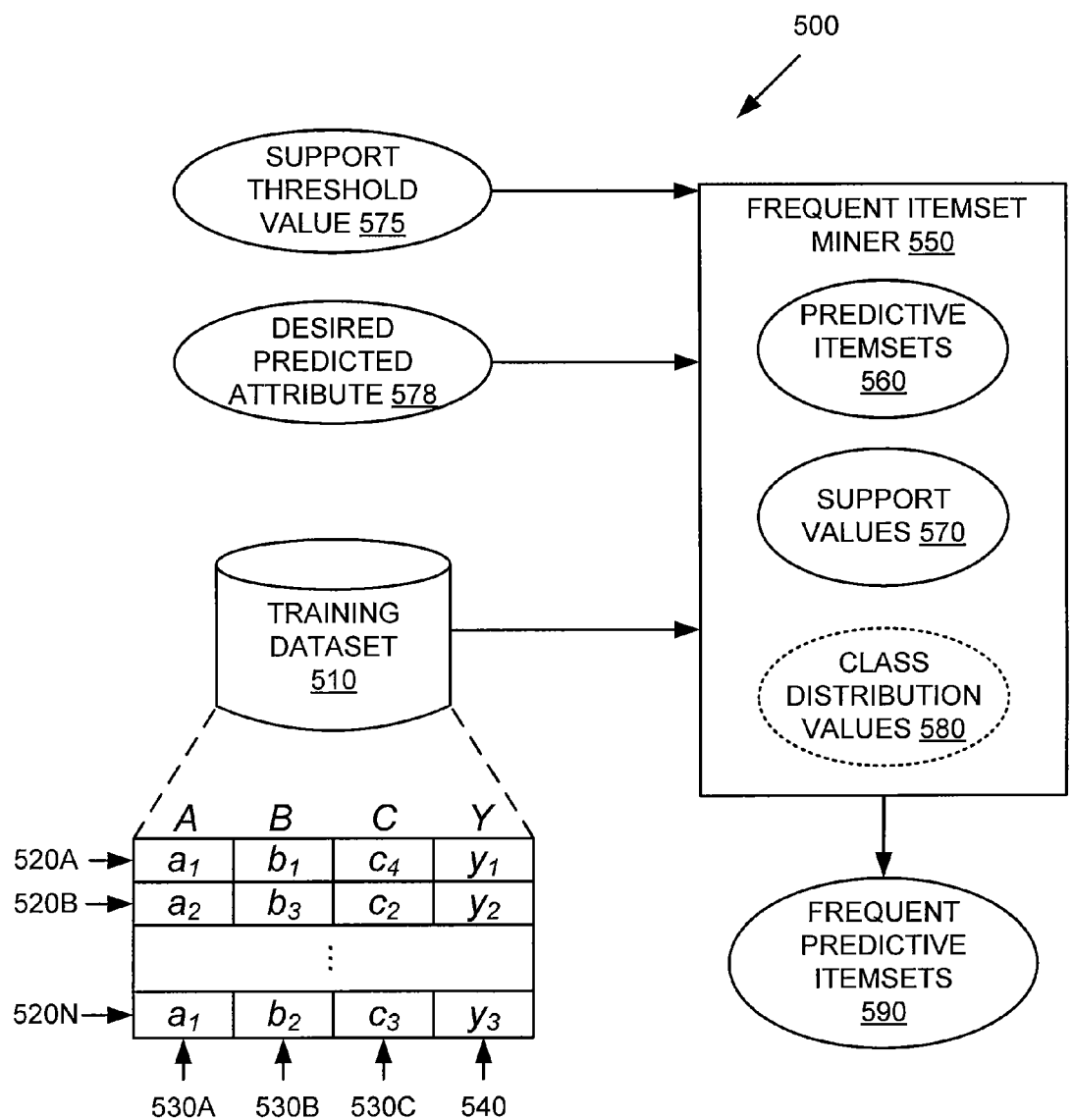
FIG. 5 is a block diagram of an exemplary system for mining frequent predictive itemsets.

FIG. 5 is a block diagram of an exemplary system 500 configured to mine frequent predictive itemsets 590 from a training dataset 510. The frequent itemset miner 550 is configured to accept the training dataset 510, the support threshold value 575, and the desired predicted attribute 578 as input and generate the frequent predictive itemsets 590.

The miner 550 is configured to ignore the predicted (e.g., class) attribute values 540 in the transactions 520, as long as any value exists. In practice, the training dataset 510 can be pre-filtered so that it has only transactions that have a value for the desired predicted attribute 578. For example, assuming the desired predicted attribute 578 is Y, the possible predictive itemsets for the transaction 520A are $(a_1)$, $(b_1)$, $(C_4)$, $(a_1, b_1)$, $(a_1, c_4)$, $(b_1, c_4)$ and $(a_1, b_1, c_4)$.

The miner 550 can be configured to select the maximum number of itemsets (e.g., the possible itemsets) from the transactions 520 or a lesser number of itemsets (e.g., the maximum number of itemsets from a subset of the transactions 520, itemsets having less than a specified number of items, or the like). Additional techniques for selecting itemsets from a training dataset 510 are possible.

In order to determine the frequent predictive itemsets 590, the miner 550 is configured to calculate a support value 570 for respective predictive itemsets 560. The support value 570 for a predictive itemset is the number of transactions in which the predictive itemset appears. The miner 550 can identify as the frequent predictive itemsets 590, those predictive itemsets 560 having a respective support value 570 meeting a support threshold value 575

Optionally, class distribution values 580 can also be calculated as the predictive itemsets are determined. Alternatively, the class distribution values 580 can be calculated after identification of the frequent predictive itemsets 590.

In practice, the desired predicted attribute 578 can be implied, fixed, or assumed. So, a separate area for storing the attribute 578 need not be maintained.

Example 11

Exemplary Class Distribution Values

In any of the examples herein, class distribution values for an itemset can indicate the distribution of values for the predicted attribute in the training dataset (e.g., when the itemset is present in the transaction). For example, for a particular predictive itemset, the predicted attribute values may be distributed among n values, with frequency $f_1$, $f_2$, $f_n$, indicating the number of transactions having different values for the predicted attribute.

Example 12

Exemplary Support Threshold Value

In any of the examples herein, the support threshold value (e.g., value 575) can be user-specified or calculated by any of the technologies described herein. For example, the systems described herein can be configured to modify the support threshold value in successive iterations until given criteria are satisfied (e.g., the number of frequent predictive itemsets is fewer than a specified maximum, the decision tree has fewer than a specified number of levels or nodes, or the like).

Similarly, the support threshold value 575 can be fixed. However, the value 575 can also be configured by an administrator or by software (e.g., in a repeating process that constructs a plurality of decision trees with different threshold values 575 as described above).

Example 13

Exemplary Method of Mining Frequent Predictive Itemsets

Figure 6:
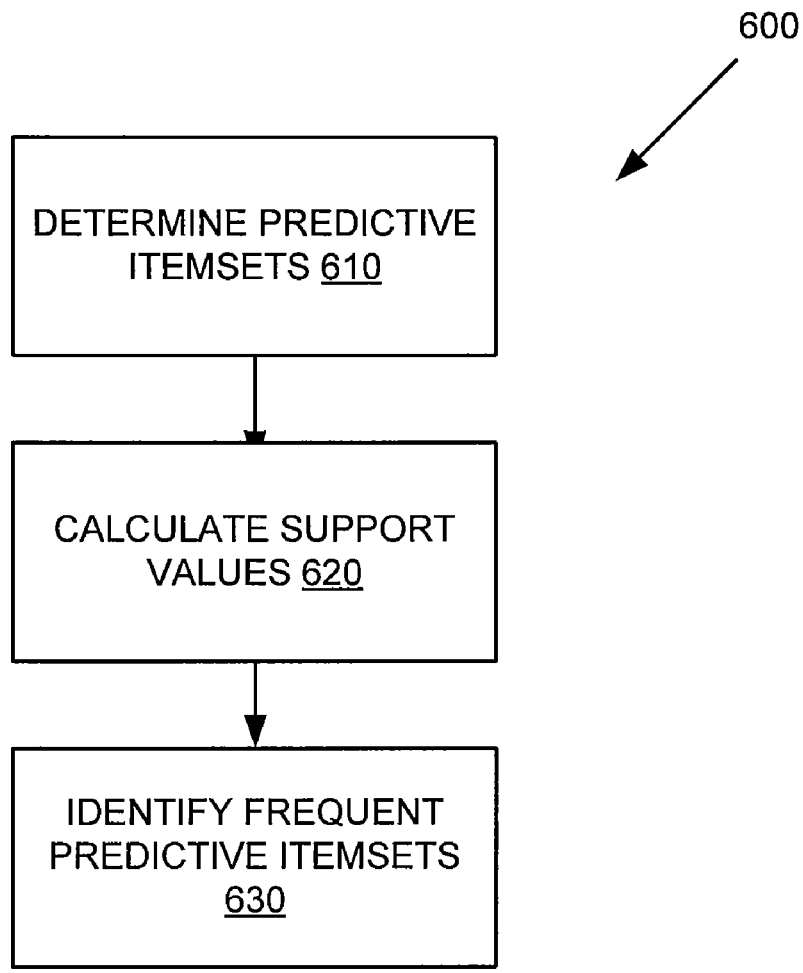
FIG. 6 is a flowchart of an exemplary method of mining frequent predictive itemsets.

FIG. 6 is a flowchart of an exemplary method 600 of mining frequent predictive itemsets from a training dataset.

At 610, the frequent predictive itemsets are determined from the training dataset. For example, the possible permutations of items (e.g., other than those for the predicted attribute) can be identified.

At 620, support values for respective itemsets are calculated.

At 630, the itemsets having a respective support value meeting a support value threshold are identified. For example, those predictive itemsets appearing in the training dataset over or at least a threshold number of times can be identified as frequent.

Alternatively, predictive itemsets having a respective support value below the support threshold value but within a margin value of the threshold value (e.g., the respective support value of the itemset meets the support threshold value minus the margin value) can be identified as frequent predictive itemsets. The margin value can be fixed or dynamically adjusted such that for predictive itemsets having a respective support value meeting the threshold value and for which there are other predictive itemsets in the dataset that are immediate supersets of the respective predictive itemsets, the other predictive itemsets are identified as frequent predictive itemsets. For example, for a dataset comprising predictive itemsets $(a_1)$, $(a_1, b_1)$, $(a_1, b_2)$ and $(a_1, b_3)$, if itemset $(a_1)$ has a support value meeting a threshold support value, the itemsets $(a_1, b_1)$, $(a_1, b_2)$ and $(a_1, b_3)$ can also be identified as a frequent predictive itemset, even if these itemsets do not have a respective support value meeting the threshold value. The margin value can also be fixed or dynamically adjusted such that at least one of the other predictive itemsets is identified as a frequent predictive itemset. In the above example, at least one of the itemsets $(a_1, b_1)$, $(a_1, b_2)$ and $(a_1, b_3)$ can be identified as a frequent predictive itemset.

The resulting frequent predictive itemsets can be output (e.g., stored in computer-readable storage media) for use in constructing a decision tree.

Example 14

Exemplary Training Dataset

In any of the examples herein, a training dataset can comprise a plurality of transactions. A transaction can be a set of related attribute values (e.g., a medical record of a single person, items purchased from a grocery store during a single shopping trip, or the like).

A decision tree can be used as a classification model predicting the value of one attribute (e.g., the predicted or class attribute) in an unclassified transaction in terms of the values of one or more remaining attributes (e.g., the predictor attributes) in the unclassified transaction. Transactions in the training dataset can be filtered to only those having a class attribute value, but can vary both in the number of predictor attribute values and in the set of predictor attributes associated with the attribute values in the transaction. A number of decision trees can be constructed from a given training dataset as any attribute can be chosen to be the predicted attribute. When repeated in a dataset, transactions can be represented as respective duplicated records. Although the transactions can be stored in a database, other mechanisms of representation are possible (e.g., XML, plain text, or the like).

The training dataset can be manifested in various forms—a set of transactions stored locally (e.g., stored in memory or a hard drive internal to a general purpose computer system executing instructions to effect the exemplary methods herein), or remotely (e.g., the transactions are accessed over a local intranet (e.g., WAN, LAN) or the Internet) to any of the exemplary systems herein, or accessed in various other manners (e.g., DVD, CD-ROM, optical drive, or the like). The training dataset may comprise multiple datasets. The training dataset can be static (e.g., decision trees are constructed only once for respective datasets) or dynamic (e.g., updated decision trees are constructed periodically).

Example 15

Exemplary Best Attribute Split

In any of the examples herein, a best attribute split (e.g., best split or best split attribute) can be the best (e.g., better or best) choice of attribute out of a set of possible attributes to add to a predictive itemset in terms of predictive accuracy for the predicted attribute. The value for the attribute to be added is assumed to be unknown (e.g., it could be any of the possible values).

For example, consider a predictive itemset (be) and a set of transactions having predictor attributes A, B, and C and a predicted attribute Y. For this predictive itemset, it may be better in terms of making an accurate prediction for the value of Y to also know the value of A (e.g., without regard to the value for C) or the value of C (e.g., without regard to the value for A). Based on transactions in the training dataset, and the class distribution values for predictive itemsets, it is possible to calculate which is better. For example, if transactions with $b_1$ have the same value for A and different values for C (e.g., that further differentiate the transaction beyond $b_1$), C is the better choice of attribute, or the best attribute split, to add to the predictive itemset $(b_1)$.

As described herein, the possible attributes can be those differentiating frequent predictive itemsets (e.g., $(a_2, b_2, c_3)$ and $(a_1, b_2, c_5)$ are differentiated by either B or C). When stored in a tree structure, the attribute splits can appear as a choice between respective sets of child or nephew nodes.

The frequent predictive itemsets can comprise an empty frequent predictive itemset (e.g., an itemset containing no items) for a which a determined best attribute split indicates which frequent predictive itemset among the itemsets containing one item provides the greatest predictive accuracy. When stored in a tree structure, the best attribute split of the empty frequent predictive itemset can be stored at a root node, the root node representing the empty frequent predictive itemset.

In practice, best attribute splits can be calculated via a hierarchical frequent predictive itemsets tree as described herein. A bottom-up traversal approach can be used so that calculations for accuracy of the higher nodes can take advantage of accuracy calculations already made for lower nodes in the tree.

Figure 7:
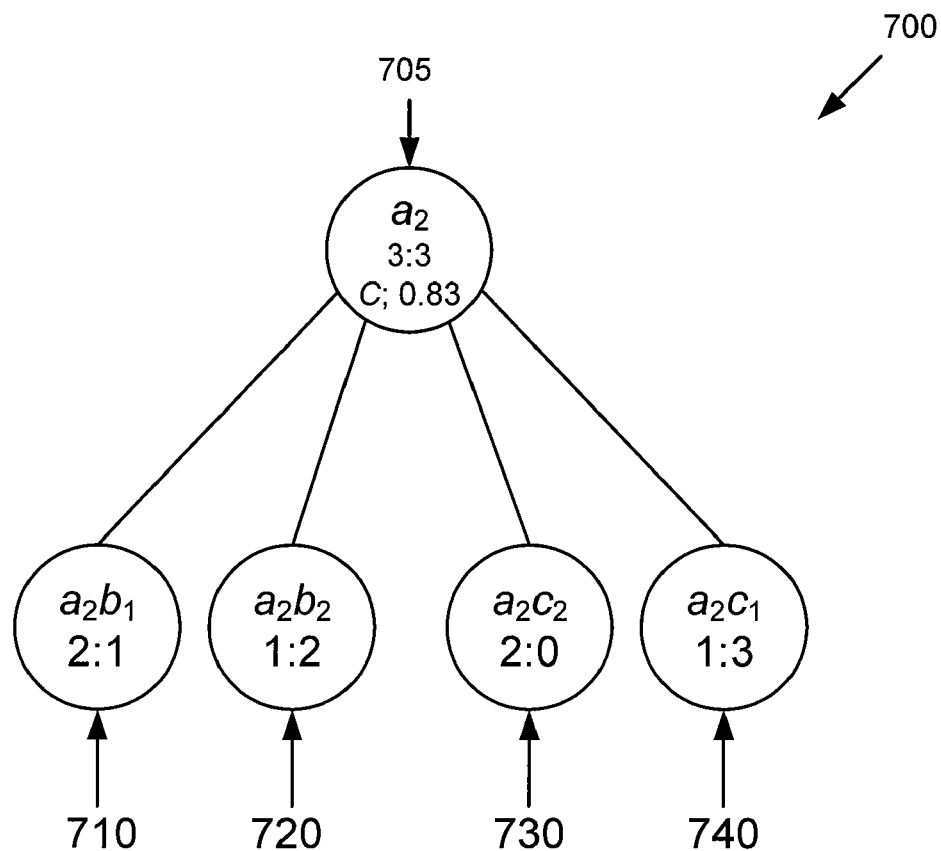
FIG. 7 is a block diagram showing predictive itemsets organized into a tree for which a best attribute split is determined.

FIG. 7 is a block diagram showing frequent predictive itemsets organized into a tree 700 for which a best attribute split is determined for a node 705. In the example, itemsets are shown in associated nodes 705, 710, 720, 730, 740. Along with the itemsets, class distribution values are stored in the nodes. For the node 705, a choice between two possible attribute splits (B and C) is to be made. Given the class distribution values, the best attribute split is C (e.g., choosing C as the attribute to split on results in greater accuracy when A is known to be $a_2$).

The result of the determination of the best attribute split (e.g., shown as C) can be stored in the node, along with the computed accuracy (e.g., shown as 0.83). In this way, nodes higher in the tree (not shown) can make use of the stored value.

Example 16

Exemplary Accuracy of an Attribute Split

In any of the examples herein, the accuracy of an attribute split can be defined as how well the split differentiates between possible predicted attribute values. For a single leaf node or for internal nodes that do not have an attribute split, the accuracy is the greatest class distribution value for any of the possible values divided by the sum of the class distribution values (e.g., 1.0 if the predicted attribute always takes the same value and 1/n if there are n values occurring with the same frequency). Thus, the class distribution values "2:1" stored at the node 710 translate to an accuracy of 0.67 because one predicted attribute value was present in two out of three transactions in the training dataset containing the frequent itemset $(a_2, b_1)$.

The accuracy of an internal node having an attribute split is based on the accuracies of its immediate superset nodes. As described herein, immediate superset nodes comprise both child nodes and nephew nodes of the internal nodes. The accuracy of a split for attribute X (e.g., having possible values $x_1, x_2 \ldots x_n$) from a node representing itemsets I can be defined as:

$$A(X; I) = \sum \frac{supp(I + x_n)}{supp(I)} * A(I + x_n)$$

Because the definition of accuracy depends on accuracies of superset nodes (e.g., nodes at one level below the node in the tree), a bottom-up approach can be used to calculate accuracies at the bottom of the tree first.

Example 17

Exemplary Best Attribute Split Calculations

In any of the examples herein, the best attribute split for an internal node in the frequent predictive itemsets tree data structure is the split that most accurately classifies the class attribute values across the training dataset. An internal node has an attribute split if two or more child nodes or nephew nodes of the internal node represent frequent predictive itemsets having the same set of attributes. Only internal nodes having a plurality of attribute splits have a best attribute split.

For frequent itemsets stored in the tree for which other predictive itemsets in the dataset are immediate supersets of the respective stored frequent itemsets, a best attribute split can be considered for the stored frequent itemsets if the immediate supersets are also stored in the tree. For example, for a stored frequent itemset $(a_1)$ mined from a dataset comprising predictive itemsets $(a_1, b_1)$, $(a_1, b_2)$ and $(a_1, b_3)$, a split on attribute B for itemset $(a_1)$ will be considered if itemsets $(a_1, b_1)$, $(a_1, b_2)$ and $(a_1, b_3)$ are stored in the tree.

Alternatively, a best split calculation can be considered if at least one of the immediate supersets is stored in the tree (e.g., in the above example, a split on attribute B for itemset $(a_1)$ will be considered if at least one of the itemsets $(a_1, b_1)$, $(a_1, b_2)$ and $(a_1, b_3)$ is stored in the tree). So, in some cases, a split can be considered even though only one item for the attribute appears in the frequent predictive itemsets tree (e.g., other items were not stored in the tree because they were not identified as frequent).

The best attribute split is determined by computing the accuracies of the respective attribute splits of internal nodes having a plurality of attribute splits and choosing the attribute with the highest accuracy as the best attribute split.

Figure 8:
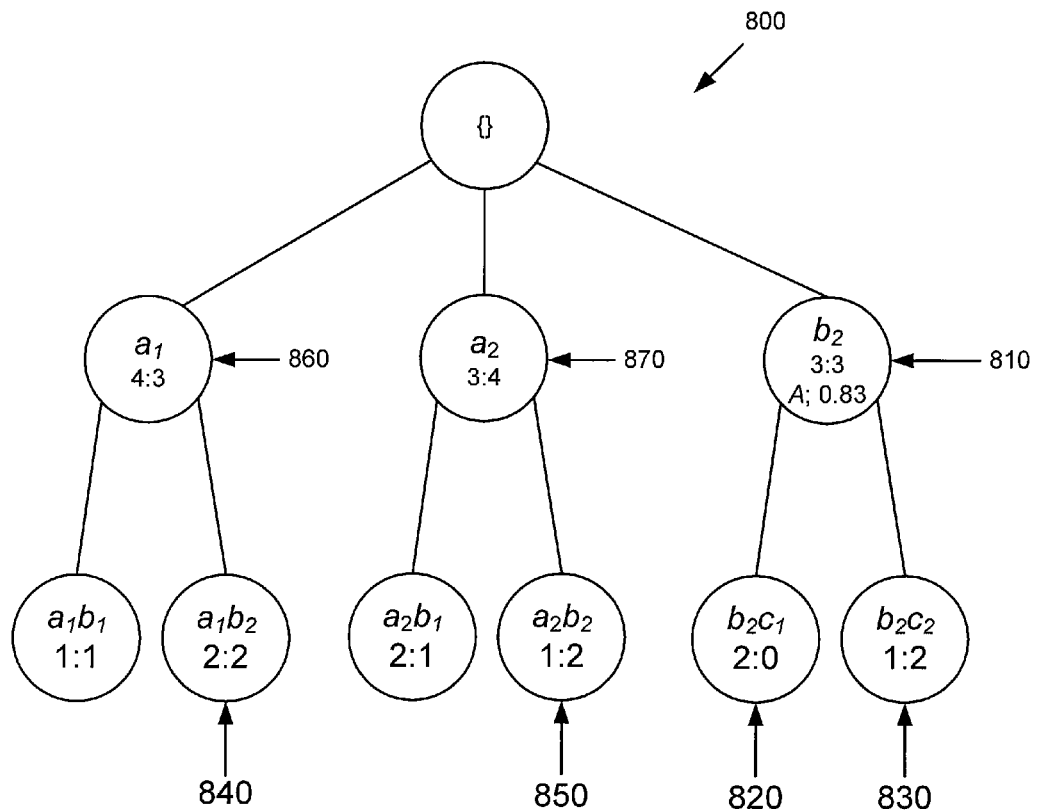
FIG. 8 is a block diagram showing predictive itemsets organized into a tree for which a best attribute split is determined using both child and nephew nodes.

For example, FIG. 8 shows frequent predictive itemsets organized into a tree 800 for which a best attribute split is determined for a node 810 having two attribute splits. Nodes 820 and 830 are associated with a split on attribute C on node 810 because they are child nodes of the node 810 and represent frequent predictive itemsets $((b_2, c_1)$ and $(b_2, c_2))$ having the same set of attributes B and C. Similarly, nodes 840 and 850 are associated with a split on attribute A on node 810 because they are nephew nodes of the node 810 (e.g., they are children of the nodes 860 and 870, sibling nodes of the node 810) and having the same set of attributes, A and B.

The best attribute split for the node 810 is determined by calculating the accuracies of splitting the node 810 on attributes A and C. The accuracy for splitting on attribute A, is:

$$A(A; b_2) = \frac{s(b_2, a_1)}{s(b_2)} \cdot A(b_2, a_1) + \frac{s(b_2, a_2)}{s(b_2)} \cdot A(b_2, a_2)$$
$$= \frac{4}{6} \cdot \frac{2}{4} + \frac{3}{6} \cdot \frac{2}{3}$$
$$= 0.67,$$

where s(itemset) is the support of an itemset and A(itemset) is an itemset's accuracy.

Similarly, the accuracy of splitting on attribute C at the node 810 can be calculated to be 0.83. Because splitting on attribute A is more accurate than splitting on attribute C, attribute A is best attribute split of the node 810. This best attribute split and its associated accuracy can be stored the node 810.

Example 18

Exemplary Best Attribute Split Determiner

Figure 9:
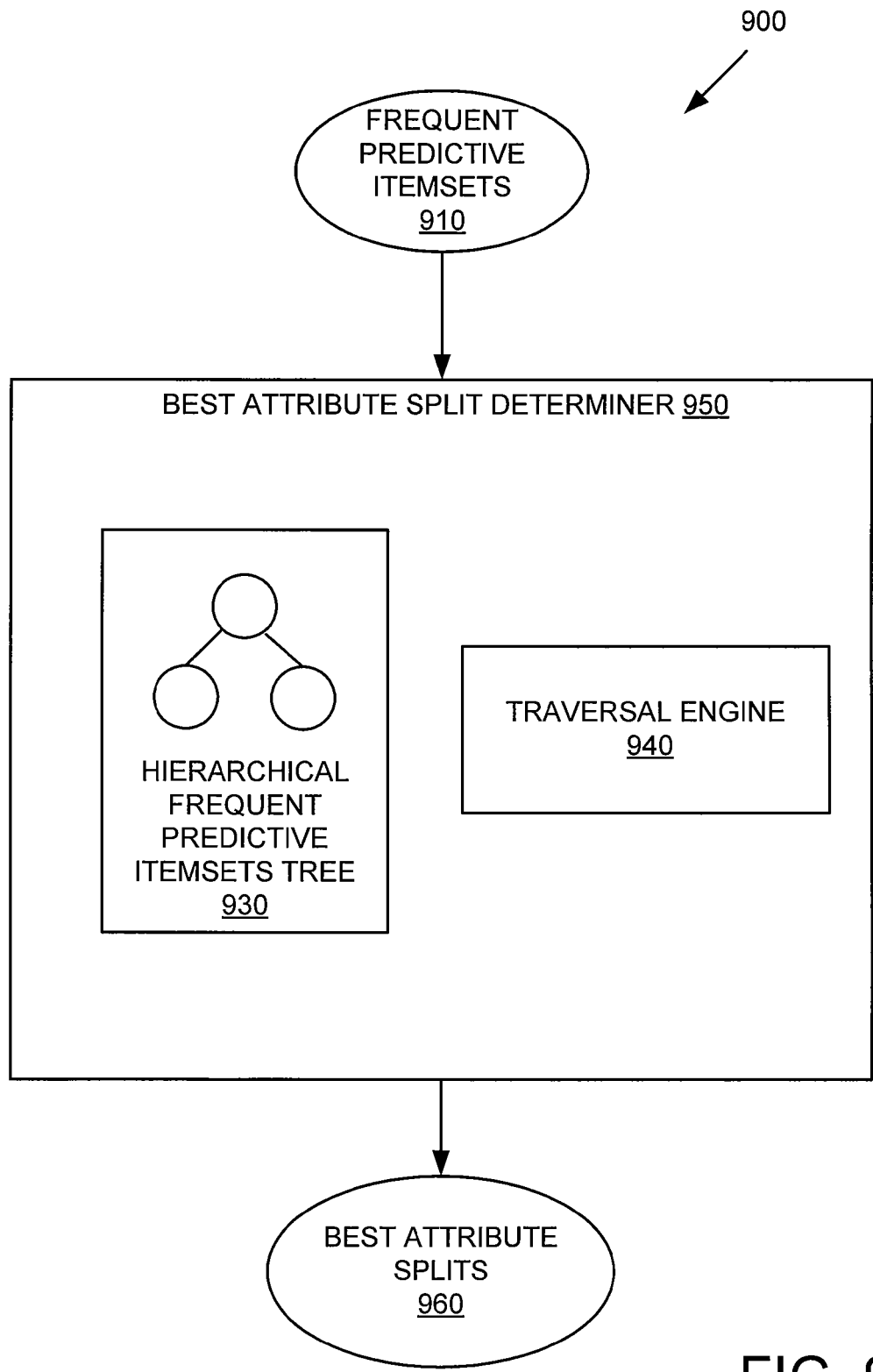
FIG. 9 is a block diagram of an exemplary best attribute split determiner with a hierarchical frequent predictive itemsets tree.

FIG. 9 is a block diagram of an exemplary best attribute split determiner 950 with a hierarchical frequent predictive itemsets tree 930.

In the example, the determiner 950 accepts the frequent predictive itemsets 910 as input. The class distribution values can also be accepted as input.

The hierarchical frequent predictive itemsets tree 930 can be constructed to store the frequent predictive itemsets 910. In practice, the tree 930 can be constructed as the frequent predictive itemsets 910 are identified, or the tree 930 can arrange itemsets 910 that have already been identified.

The traversal engine 940 can adopt a bottom-up traversal approach to traverse the tree 930 and is configured to store calculated accuracies for attribute splits. The accuracies can be stored separately or in the tree 930 (e.g., in a node for which the split can be applied).

The best attribute splits 960 can be output separately or can be stored in the tree 930. As described herein, calculation of accuracy can include determination of best attribute splits (e.g., the best attribute splits for lower nodes in the tree can be used as a basis for calculating accuracy in higher nodes of the tree).

Example 19

Figure 10:
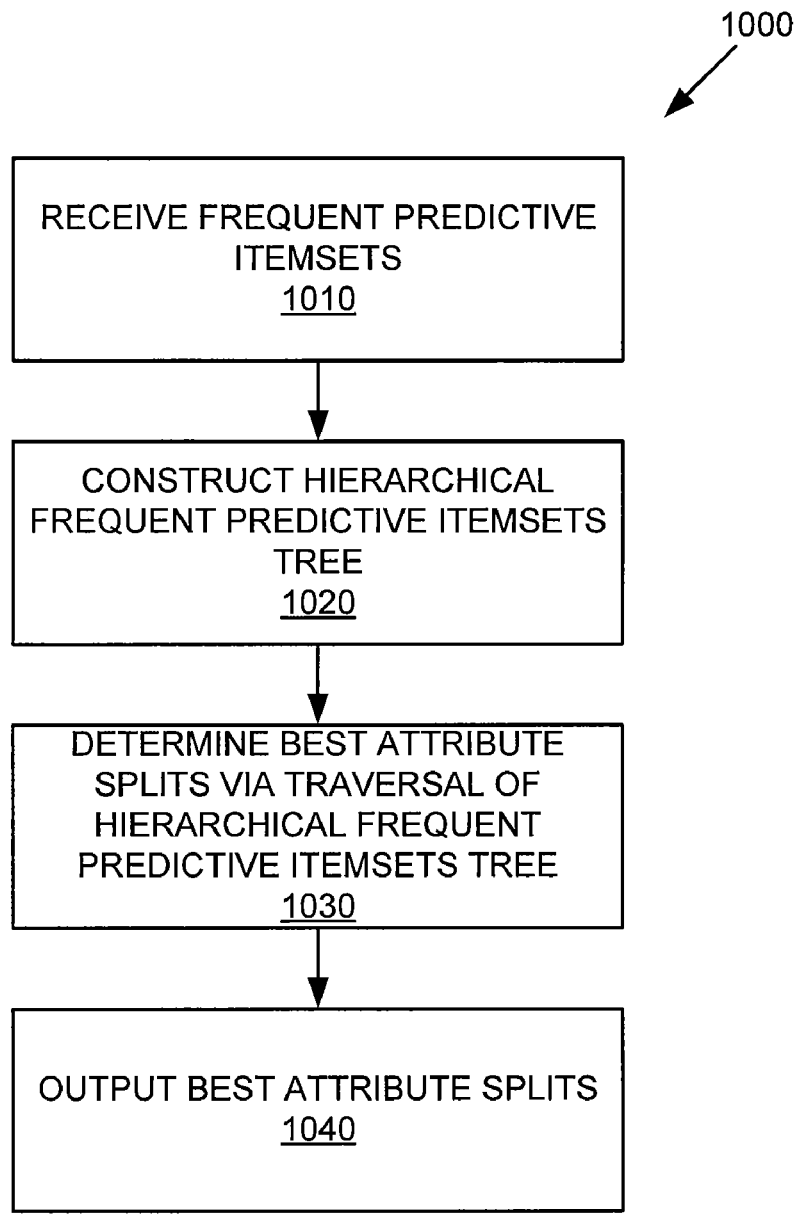
FIG. 10 is a flowchart of an exemplary method of determining best attribute splits via a hierarchical frequent predictive itemsets tree.

Exemplary Method of Determining Best Attribute Splits Via a Hierarchical Frequent Predictive Itemsets Tree FIG. 10 is a flowchart of an exemplary method 1000 of determining best attribute splits via a hierarchical frequent predictive itemsets tree.

At 1010, the frequent predictive itemsets are received.

As described herein, the itemsets can already be arranged in a hierarchical predictive itemsets tree. If not, at 1020, a hierarchical frequent predictive itemsets tree is constructed. For example, itemsets having fewer items can be stored at higher levels, and itemsets having more items can be stored at a lower level (e.g., supersets can be stored under respective parent nodes representing sets). The root can be an empty set.

Superset relationships exist not only between parent and child nodes of the tree but also between uncle and nephew nodes. For example, in FIG. 8, the node 840 is a superset of both the node 860 (its parent) and the node 810 (its uncle). As described herein, the exemplary methods for determining best attribute splits and for choosing nodes for inclusion in a decision tree can utilize both parent-child and uncle-nephew superset relationships.

At 1030, the best attribute splits are determined via traversal of the hierarchical frequent predictive itemsets tree.

At 1040, the best attribute splits are output. In practice, output can simply be storing the tree.

Example 20

Exemplary Frequent Predictive Itemsets Tree Data Structure

In any of the examples herein, a frequent predictive itemsets tree can be used to organize and store the frequent predictive itemsets. Such a tree can be a data structure stored in one or more computer-readable media.

Nodes of the tree can initially represent predictive itemsets. Class distribution values can be stored in nodes representing respective itemsets for which class distribution values have been calculated.

The tree can be hierarchical in that itemsets with fewer items are at higher levels of the tree, and those with more items are at lower levels of the tree. Thus, the immediate children and nephews of a node can represent itemsets that are supersets of the itemset represented by the node. To preserve the hierarchy, the root can represent an empty itemset.

During calculation of accuracies for best attribute splits, the nodes of the tree can store accuracies. For example, if a node represents an itemset, the accuracy for the best attribute split for the itemset can be stored in the node. Subsequently, when accuracy is calculated for a parent or an uncle of the node (e.g., for the best attribute split for the itemset represented by the parent or uncle of the node), the accuracy for the best attribute split is available for comparison with other best attribute splits that have already been calculated.

The hierarchical frequent predictive itemsets tree data structure can be used to organize and store the frequent predictive itemsets. The data structure can comprise a root node, leaf nodes and internal nodes. Internal nodes and leaf nodes can correspond to respective frequent predictive itemsets and store respective labels, support values and a plurality of class distribution values, all or some of which may be stored at the respective node. A label can be the set of items comprising the frequent predictive itemset associated with the internal node or an incremental label (e.g., the final item in a frequent predictive itemset whose items have been ordered according to an attribute order). The itemset represented by a node in an incremental label arrangement can be the set of items accumulated by navigating to the node from the root (e.g., adding one item per node to the itemset at a time). The support value indicates the frequency with which the frequent predictive itemset occurs in the dataset.

The plurality of class distribution values indicates the frequency with which values of the class attribute occur in the dataset. For example, if a leaf node stores the class distribution values "2:1," the class distribution indicates that for the three transactions in the training dataset containing the frequent predictive itemset represented by the node, the value for the predicted item was a first value 2 times and a second value 1 time. Internal nodes can also store a best attribute split and a best attribute split accuracy.

Alternatively, the labels, support values, class distribution values, best attribute splits and best attribute split accuracies can be stored in another data structure or other multiple data structures.

Because a frequent predictive itemsets tree can be traversed using a prefix technique, it is sometimes called a "prefix tree."

The frequent predictive itemsets tree can be used as shorthand for a full tree in which all superset-subset relation between frequent predictive itemsets are represented by a parent-child relationship. As such, the tree can become weighted to one side (e.g., to the left side in a left-to-right traversal) and the other side can omit nodes appearing on the weighted side. For example, superset nodes of a particular node (e.g., nodes representing itemset supersets of an itemset represented by a particular node) for nodes on the unweighted side can be stored at nephew nodes rather than child nodes of a particular node.

Example 21

Exemplary Bottom-Up Traversal

In any of the examples herein, a bottom-up traversal (e.g., prefix navigation) can be implemented for determining best attribute splits. For example, in a recursive approach, subtrees of a node can be processed before the node itself is processed. Processing can include determining an accuracy for an attribute split (e.g., based on class distribution values for the predicted attribute).

Bottom-up traversal is also sometimes called "depth first" because lower nodes are processed (e.g., values for nodes are calculated) before higher ones during traversal.

In prefix navigation, the children nodes can be recursively processed before the node is processed. In a tree where uncle-nephew superset relationships exist, nephews are processed before the uncle node is processed. For example, nodes at a level can be recursively processed in a left-right-root manner.

Accuracies for attribute splits at lower levels of the hierarchical frequent predictive itemsets tree can be calculated before calculating accuracies for attribute splits at higher levels of the hierarchical frequent predictive itemsets tree data structure. The accuracies of the higher levels can rely on the calculations already stored for lower levels (e.g., an immediately lower level).

Example 22

Exemplary System for Storing Frequent Predictive Itemsets

Figure 11:
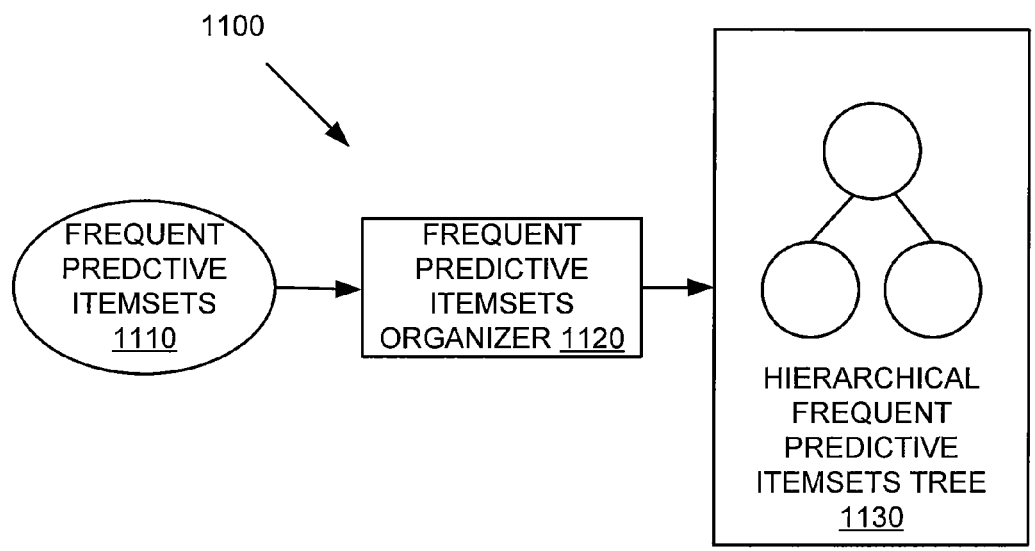
FIG. 11 is a block diagram of an exemplary system organizing frequent predictive itemsets.

FIG. 11 is a block diagram of an exemplary system 1100 organizing frequent predictive itemsets 1110 into a hierarchical frequent predictive itemsets tree 1130.

The frequent predictive itemsets organizer 1120 is configured to arrange the frequent predictive itemsets 1110 into a hierarchical arrangement in the tree 1130. For example, itemsets that are immediate supersets of an itemset can be immediate child nodes or nephew nodes of nodes representing the itemset.

Example 23

Exemplary Method of Storing Frequent Predictive Itemsets

Figure 12:
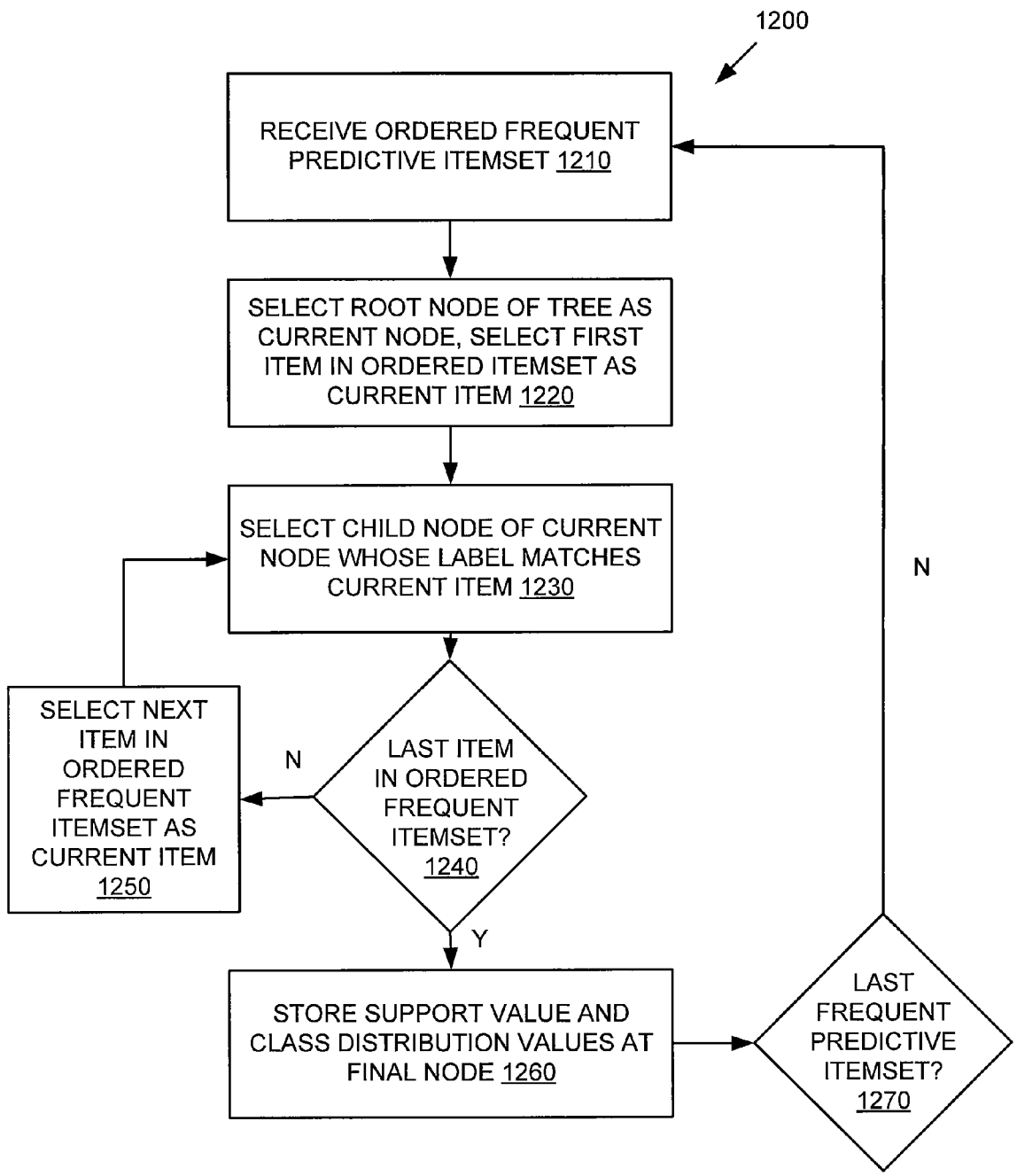
FIG. 12 is a flowchart of an exemplary method of organizing frequent predictive itemsets.

FIG. 12 is a flowchart of an exemplary method 1200 of organizing frequent predictive itemsets into a hierarchical frequent predictive itemsets tree.

At 1210, the frequent predictive itemsets are received. An order can be associated with the itemsets. For example, attributes can be ordered arbitrarily or according to a specified priority. The itemset can be sorted based on the order of the attributes or some other ordering mechanism (e.g., a dictionary, string comparison, or the like).

At 1220, the root node of the tree is selected as the current node. The first item in an ordered itemset is selected as the current item.

At 1230, the child node of the current node whose label matches the current item is selected. If no child node has a label matching the current item, a child node whose label matches the current item is created and selected. This created node is placed in relation to its siblings according to the order associated with the itemset.

At 1240, if the last item in the ordered frequent itemset has not yet been reached, the next item in the ordered frequent itemset is selected as the next item at 1250.

Otherwise, at 1260, the class distribution values are stored at a final node. The support value can also be stored at the final node.

If the last frequent predictive itemset is not yet reached at 1270, processing continues at 1210.

Example 24

Exemplary System for Constructing Decision Tree

Figure 13:
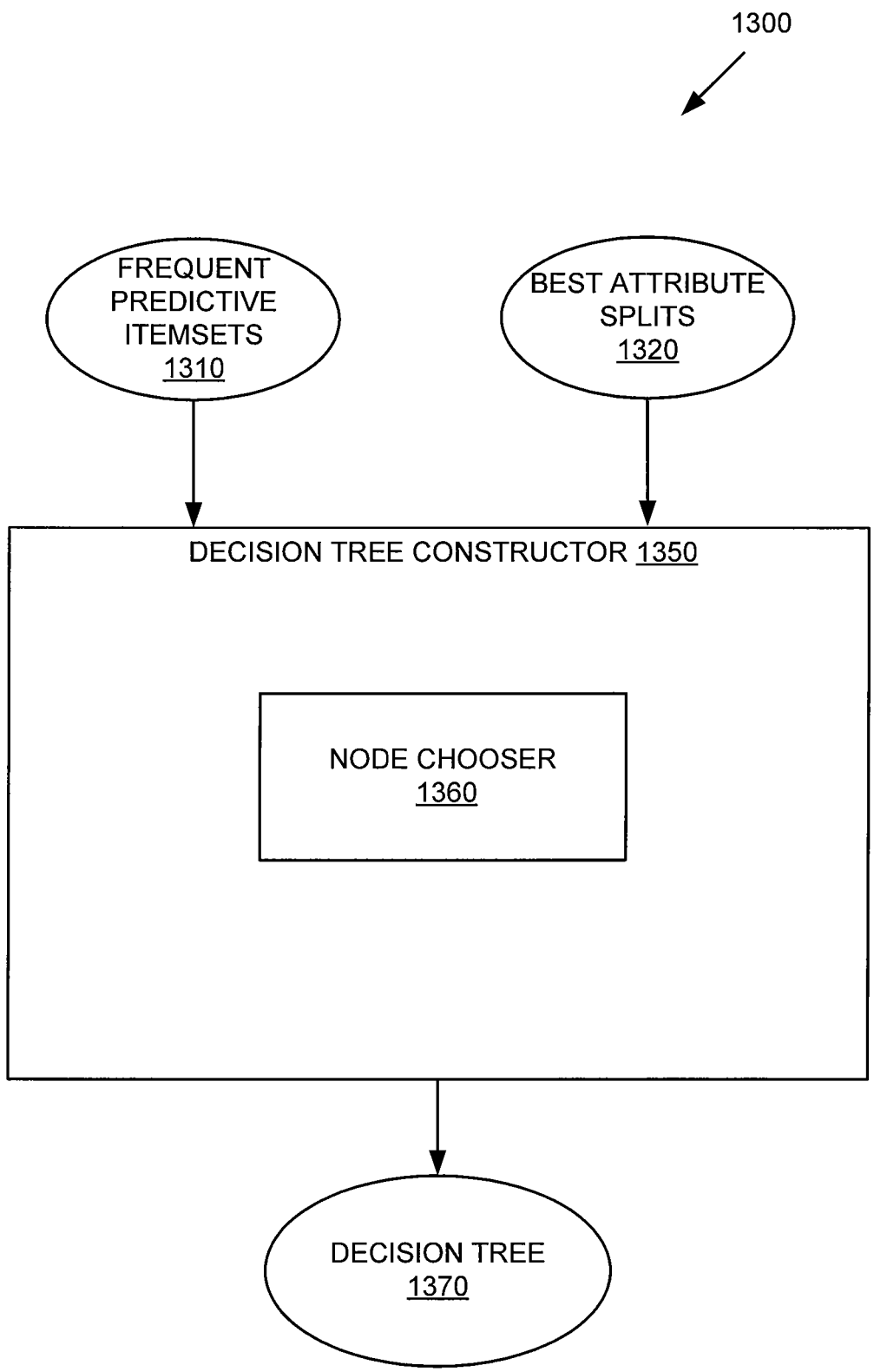
FIG. 13 is a block diagram of an exemplary system constructing a decision tree.

FIG. 13 is a block diagram of an exemplary system 1300 constructing a decision tree 1370.

The decision tree constructor 1350 is configured to accept the frequent predictive itemsets 1310 and the best attribute splits 1320 as input. As described herein, both can be represented in a single hierarchical frequent predictive itemsets tree.

The decision tree constructor includes a node chooser 1360 configured to choose nodes for inclusion in the decision tree 1370. For example, in the case of a hierarchical frequent predictive itemsets tree, the nodes corresponding to best attribute splits can be chosen (e.g., a subset of nodes in the tree). The nodes can then be used to generate the decision tree 1370.

Example 25

Exemplary Method of Constructing Decision Tree

Figure 14:
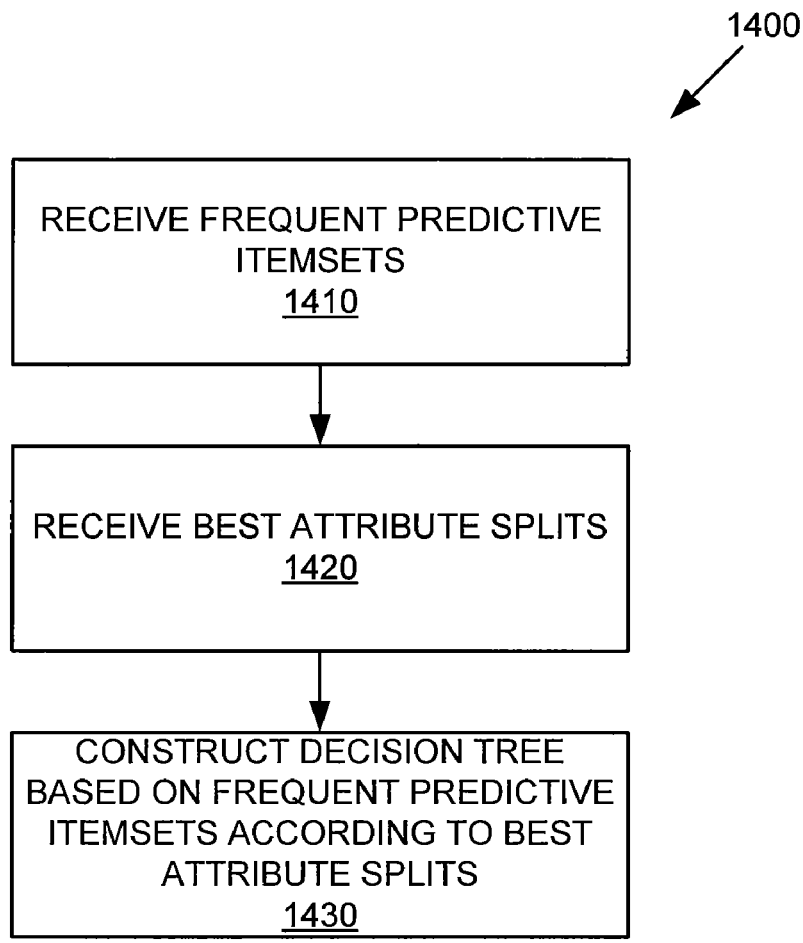
FIG. 14 is a flowchart of an exemplary method of constructing a decision tree.

FIG. 14 is a flowchart of an exemplary method 1400 of constructing a decision tree. At 1410, the frequent predictive itemsets are received, and at 1420, the best attribute splits are received. As described herein, both can be combined into a hierarchical frequent predictive itemsets tree and received at the same time.

At 1430, a decision tree is constructed based on the frequent predictive itemsets according to the best attribute splits. For example, in an implementation using a hierarchical frequent predictive itemsets tree, a subset of the frequent predictive itemsets (e.g., nodes in the tree) can be chosen (e.g., based on best splits). This subset can comprise the frequent predictive itemsets encountered by traversing the tree in a top-down fashion and following the best attributes splits at successive levels. For example, starting at a root node, the child nodes associated with the best attribute split of the root node are chosen. For these child nodes, their child nodes and their nephew nodes having a superset-subset relation with them that are associated with the best attribute splits for the child nodes are chosen. This process is repeated until all best-attribute-split paths have exhausted (e.g., each path has reached a leaf node). The terms "traversing" and "paths" as used in constructing the decision tree do not limit the method to only following parent-child arcs as the tree is traversed. The nodes chosen at any level for inclusion in the decision tree can be either child or nephews nodes.

The chosen frequent predictive itemsets can be represented in the decision tree as decision nodes corresponding to the attribute splits of the chosen itemsets (e.g., the best attribute splits for selected itemsets having a plurality of attribute splits, the attribute split of selected itemsets having one attribute split). So, if the best attribute split is for attribute B, the node in the decision tree can represent a decision regarding the value of B, and the decision tree is traversed down according to the value of B (e.g., down one path if B is $b_1$, down another if B is $b_2$, and the like).

Alternatively, the decision tree can be constructed independent of a hierarchical frequent predictive itemset tree. For example, the frequent predictive itemsets consisting of one item can be examined. If these itemsets have a value for one attribute, that attribute can be selected. Otherwise, the attribute matching the best attribute split for the empty frequent predictive itemset, as described herein, can be chosen. The chosen attribute can be the basis of the decision represented by the decision tree root node. The frequent predictive itemsets can then be divided into subgroups in which the frequent predictive itemsets in a subgroup have the same value for the chosen attribute. One child node is created for the unique values of the chosen attribute. This process can be repeated for the sets of frequent predictive itemsets belonging to the subgroups.

The decision tree can be a separate data structure from the frequent predictive itemset tree and can be constructed as the frequent predictive itemsets are chosen at 1430. The frequent predictive itemsets can be chosen via a top-down traversal of the frequent predictive itemset tree or in another manner of traversal.

Example 26

Exemplary Implementation: Training Dataset

In FIG. 15, an exemplary training dataset 1500 comprises a set of transactions 1510. The transactions 1510 have a predicted attribute 1530 HEALTH and predictor attributes 1520 DIET, SMOKER and EXERCISE FREQUENCY. In the example, the predicted attribute domain is (GOOD, POOR) and the predictor attribute domains are (HEALTHY, UNHEALTHY), (Y, N) and (DAILY, WEEKLY, MONTHLY) for the DIET, SMOKER and EXERCISE FREQUENCY predictor attributes respectively.

Example 27

Exemplary Implementation: Frequent Predictive Itemset

FIG. 16 shows frequent predictive itemsets 1600 mined from the exemplary training dataset 1500 for a support threshold value of 2. That is, the items for the respective frequent predictive itemsets 1600 occur in at least two transactions in the training dataset 1500. For example, the predictive itemset (HEALTHY) is a frequent predictive itemset because the item HEALTHY appears in eight transactions of the dataset 1500.

The frequent predictive itemset (HEALTHY) has predictive attribute distribution values (e.g., class distribution values), P(GOOD, POOR), of 5:3, which means that of the eight transactions containing the itemset (HEALTHY), the predicted attribute value was GOOD in five of the transactions and POOR in the other three.

Example 28

Exemplary Class Association Rules

In any of the examples herein, the mining of frequent predictive itemsets can be based on class association rules. A class association rule (CAR) is a statistical relationship between sets of items in a transaction and takes the form (predictive itemset → predicted attribute value), which means that the occurrence of the items for a predictive itemset in a transaction can imply that the transaction also has the specified predicted attribute value. For example, $(a_1, b_1 \to c_1)$ means that occurrence of predictive itemset $(a_1, b_1)$ in a transaction implies that the transaction has a predicted attribute value of $c_1$.

The antecedent support of a CAR is the number of transactions in the training dataset containing the predictive items of the rule. For example, the antecedent support of $(a_1, b_1 \to c_1)$ is the number of transactions containing the items $a_1$ and $b_1$.

Example 29

Exemplary Implementation: Decision Tree

Figure 17:
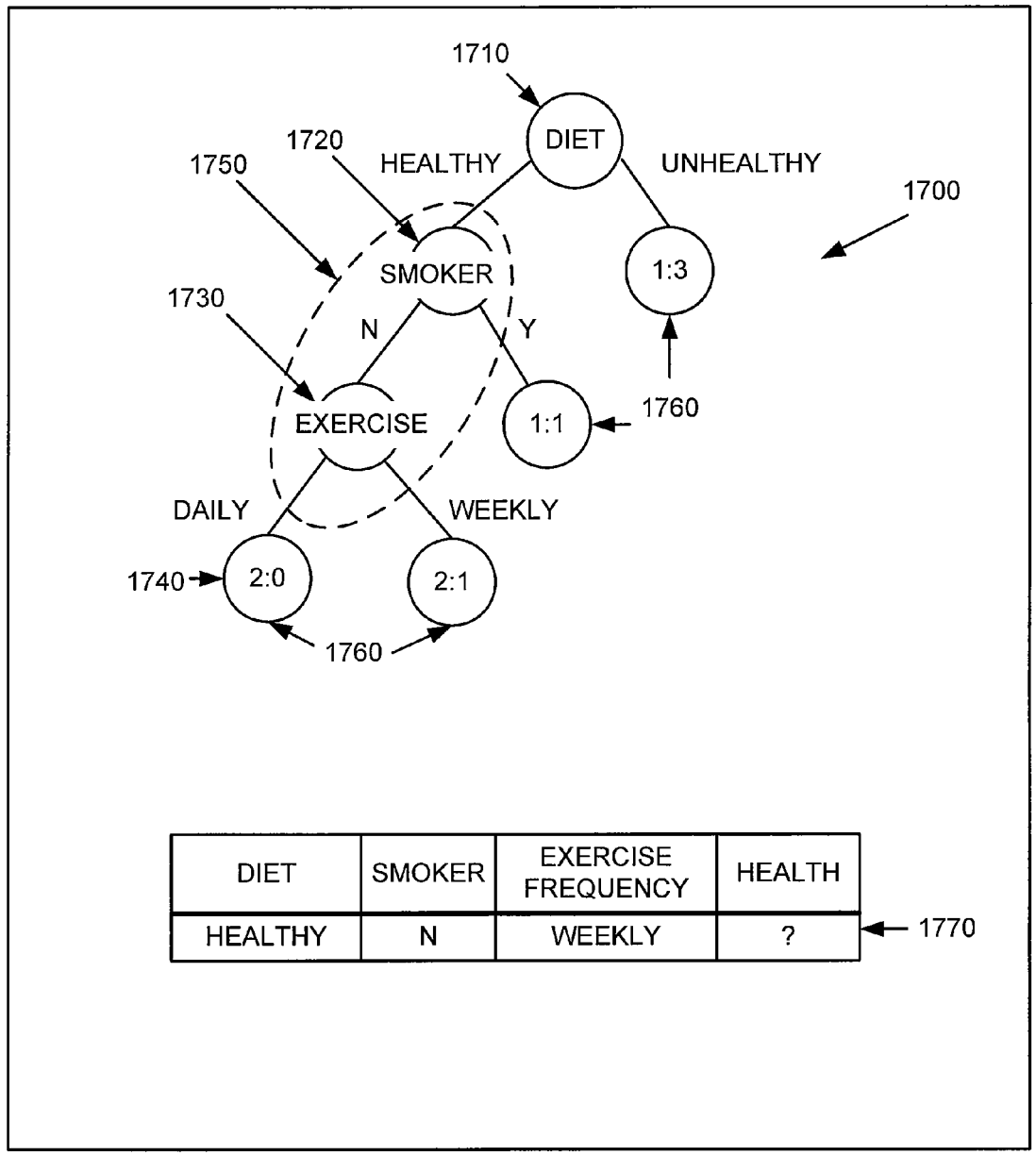
FIG. 17 shows application of an exemplary decision tree constructed from the frequent predictive itemsets of FIG. 16.

FIG. 17 is an exemplary decision tree 1700 that can be generated by the technologies based on the training dataset 1500. Nodes in the decision tree 1700 represent a decision to be made based on a predictor attribute during classification. Beginning at a root node 1710 and traversing the decision tree 1700 by making decisions at successive levels of the tree 1700 based on predictor attributes stored at internal nodes 1750 in the tree, one of the leaf nodes 1760 is reached from which the probability that the predicted attribute of a transaction to be classified has a given value can be determined.

The decision tree 1700 can be used to classify an unclassified transaction 1770. Traversal of the decision tree begins at the root node 1710 which splits on the DIET attribute. The DIET attribute of the transaction 1770 has the value HEALTHY. Thus, the decision at the root node 1710 leads to traversing the tree 1700 from the root node 1710 to the internal node 1720 via the path labeled HEALTHY. The internal node 1720 splits on the SMOKER attribute. The SMOKER attribute of the transaction 1770 has a value of Y, which leads to a traversal to a node 1730. The node 1730 splits on the EXERCISE FREQUENCY attribute. The EXERCISE FREQUENCY attribute of the transaction 1770 has a value of WEEKLY, which leads to a traversal to a leaf node 1740. Arrival at the leaf node 1740 allows the decision tree to classify the predicted attribute HEALTH value of the transaction 1770 as having a 33% chance of having the value GOOD and a 67% chance of having the value POOR.

Example 30

Exemplary System for Determining Best Attribute Splits

Figure 18:
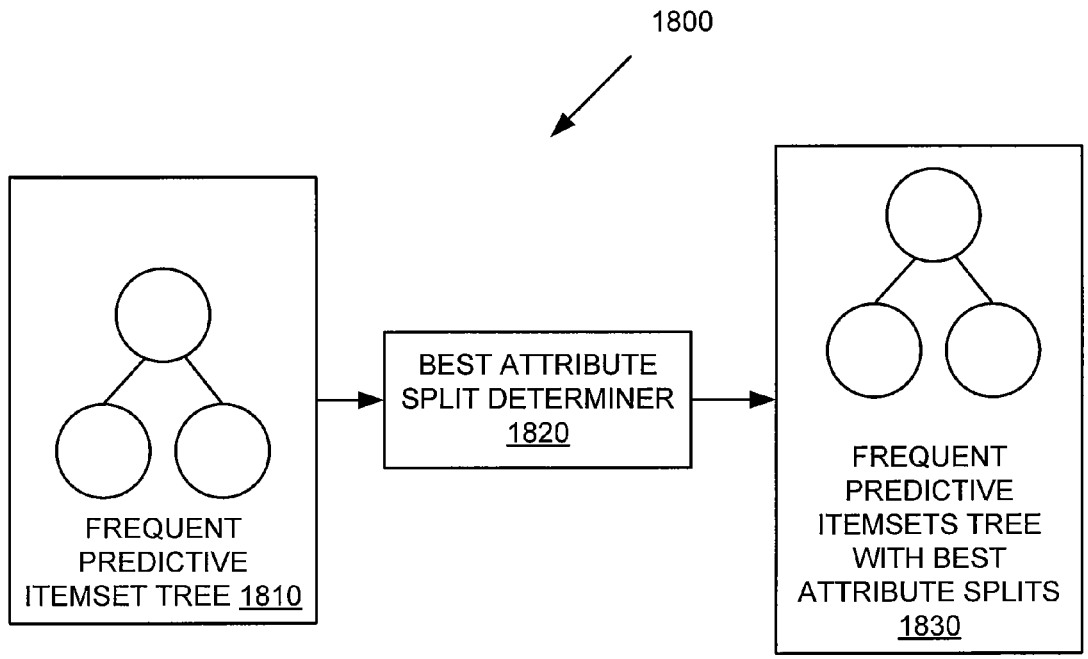
FIG. 18 is a block diagram of an exemplary system for determining best attribute splits.

FIG. 18 is a block diagram of an exemplary system 1800 for determining best attribute splits. A best attribute split determiner 1820 is configured to receive a frequent predictive itemset tree 1810 as input and generates a frequent predictive itemset tree with best attribute splits 1830.

Example 31

Exemplary Method of Determining Best Attribute Splits

Figure 19:
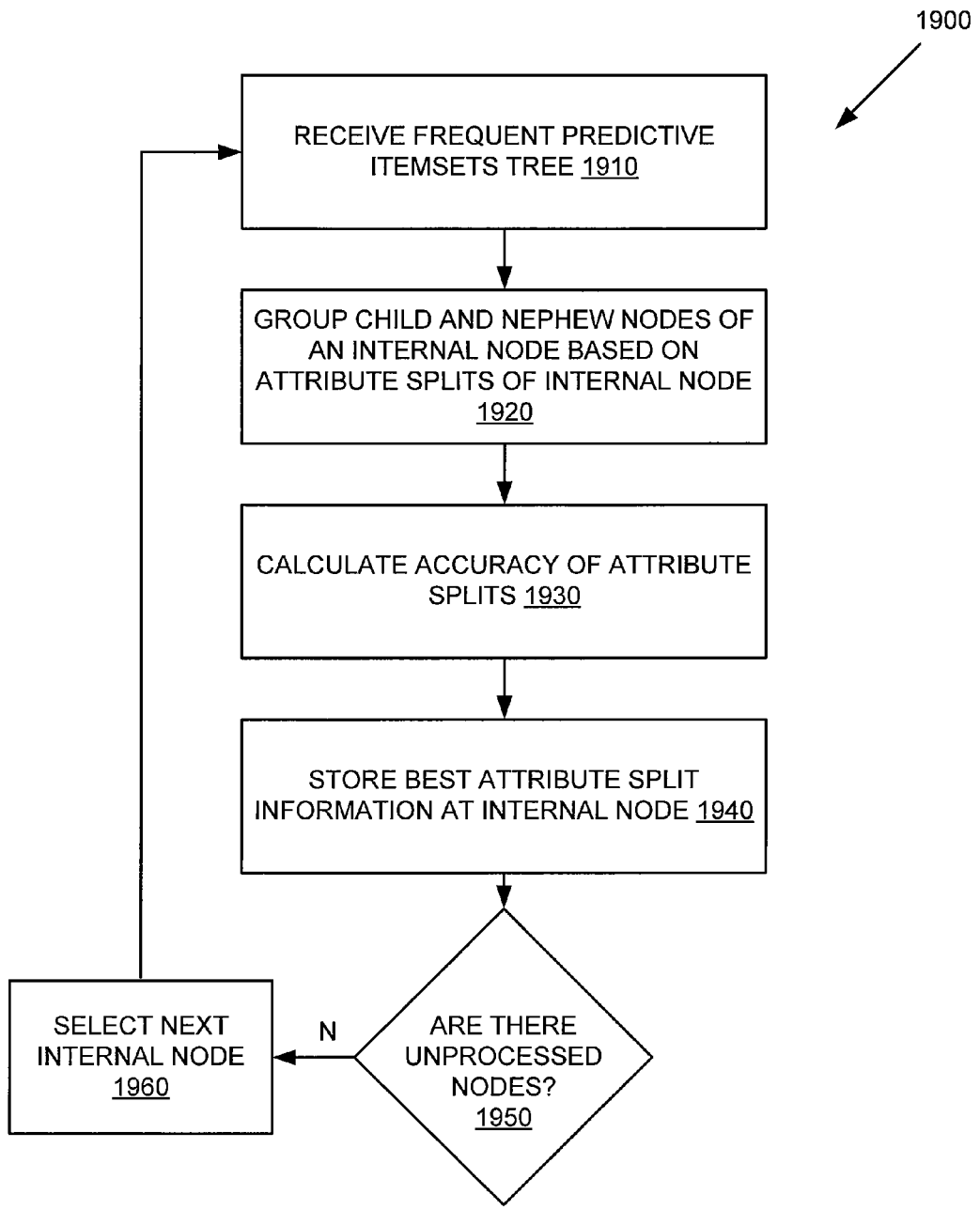
FIG. 19 is a flowchart of an exemplary method of determining best attribute splits.

FIG. 19 is a flowchart of an exemplary method 1900 for determining best attribute splits. At 1910, a frequent predictive itemset tree is received. At 1920, the child nodes of an internal node having a plurality of attribute splits and nephew nodes having a subset relationship with such internal nodes are grouped according to the attribute splits that the respective child and nephew nodes are associated with. For example, nodes representing itemsets $(a_1, b_1)$, $(a_2, b_1)$, $(b_1, c_1)$ and $(b_1, c_2)$ and that are child and nephew nodes of a node representing itemset $(b_1)$ are grouped into two groups: $(a_1, b_1)$, $(a_2, b_2)$ and $(b_1, c_1)$, $(b_1, c_2)$, according to attributes A and C, the attribute splits of parent-uncle node $b_1$. At 1930, the accuracies for the attribute splits are calculated as described herein. At 1940, the attribute split having the greatest accuracy is identified as the best attribute split and information relating to the best attribute split is stored at the internal node. This information can include the best attribute split itself (e.g., B or C) and the accuracy of the best attribute split.

At 1950, the exemplary method checks to see if there are nodes in the frequent predictive itemset tree that remain to be processed. If so, the next internal node having a plurality of attribute splits is selected at 1960 and the exemplary method 1900 is repeated. The next internal node can be selected via a bottom-up traversal of the tree, as described herein.

Example 32

Figure 20:
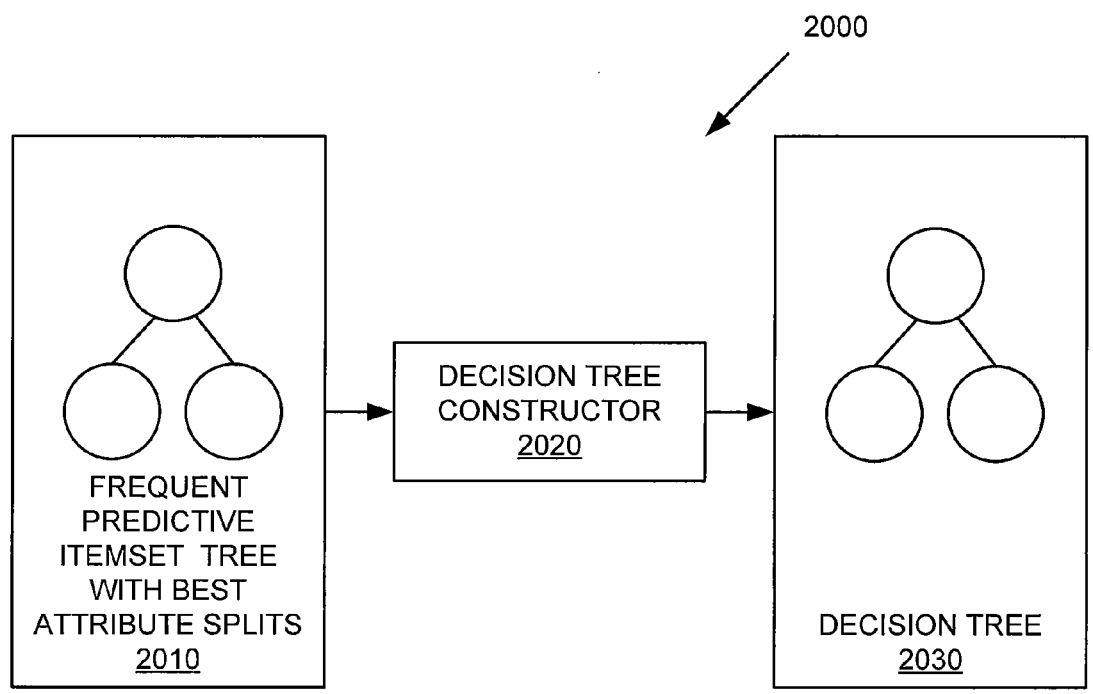
FIG. 20 is a block diagram of an exemplary system for constructing decision trees from frequent predictive itemsets tree data structures.

Exemplary System for Constructing Decision Tree from Frequent Predictive Itemsets Tree with Best Attribute Splits FIG. 20 is a block diagram of an exemplary system 2000 for constructing a decision tree 2030 from a frequent predictive itemsets tree with best attribute splits 2010. The decision tree constructor 2020 is configured to accept the frequent predictive itemsets tree with best attribute splits 2010 as input. The constructor 2020 constructs the decision tree 2030 based on best attribute splits of the frequent predictive itemsets tree 2010.

Example 33

Figure 21:
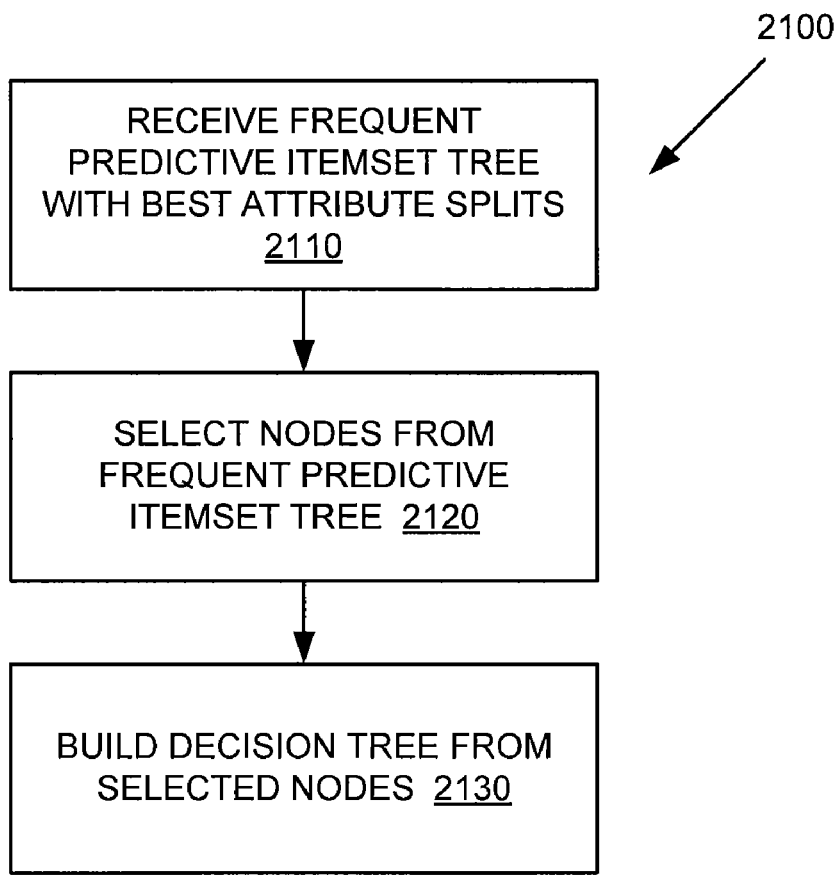
FIG. 21 is a flowchart of an exemplary method of constructing decision trees from frequent itemsets tree data structures.

Exemplary Method of Constructing a Decision Tree from a Frequent Predictive Itemsets Tree with Best Attribute Splits FIG. 21 is a flowchart of an exemplary system 2100 for constructing a decision tree from a frequent predictive itemset tree with best attribute splits. At 2110, the frequent predictive itemsets tree with best attribute splits is received. At 2120, for nodes of the decision tree having a best attribute split, child nodes of the respective nodes or nephew nodes having a subset relationship with the respective nodes, associated with the best attribute split of the respective nodes are chosen for inclusion in the decision tree. For example, for a node representing frequent predictive itemset $(c_1)$ and having a best attribute split A, nephew nodes representing itemsets $(a_1, c_1)$ and $(a_2, c_1)$, associated with attribute A, can be chosen for inclusion in the decision tree.

At 2130, the decision tree can be constructed from the chosen nodes in the frequent predictive itemset tree. For the chosen nodes at a given level in the frequent itemset tree, corresponding respective nodes in the decision tree exist having child nodes corresponding to chosen nodes in the frequent itemset tree representing immediate supersets of the chosen nodes.

Example 34

Exemplary Implementation: Storing Frequent Predictive Itemsets

Figure 22:
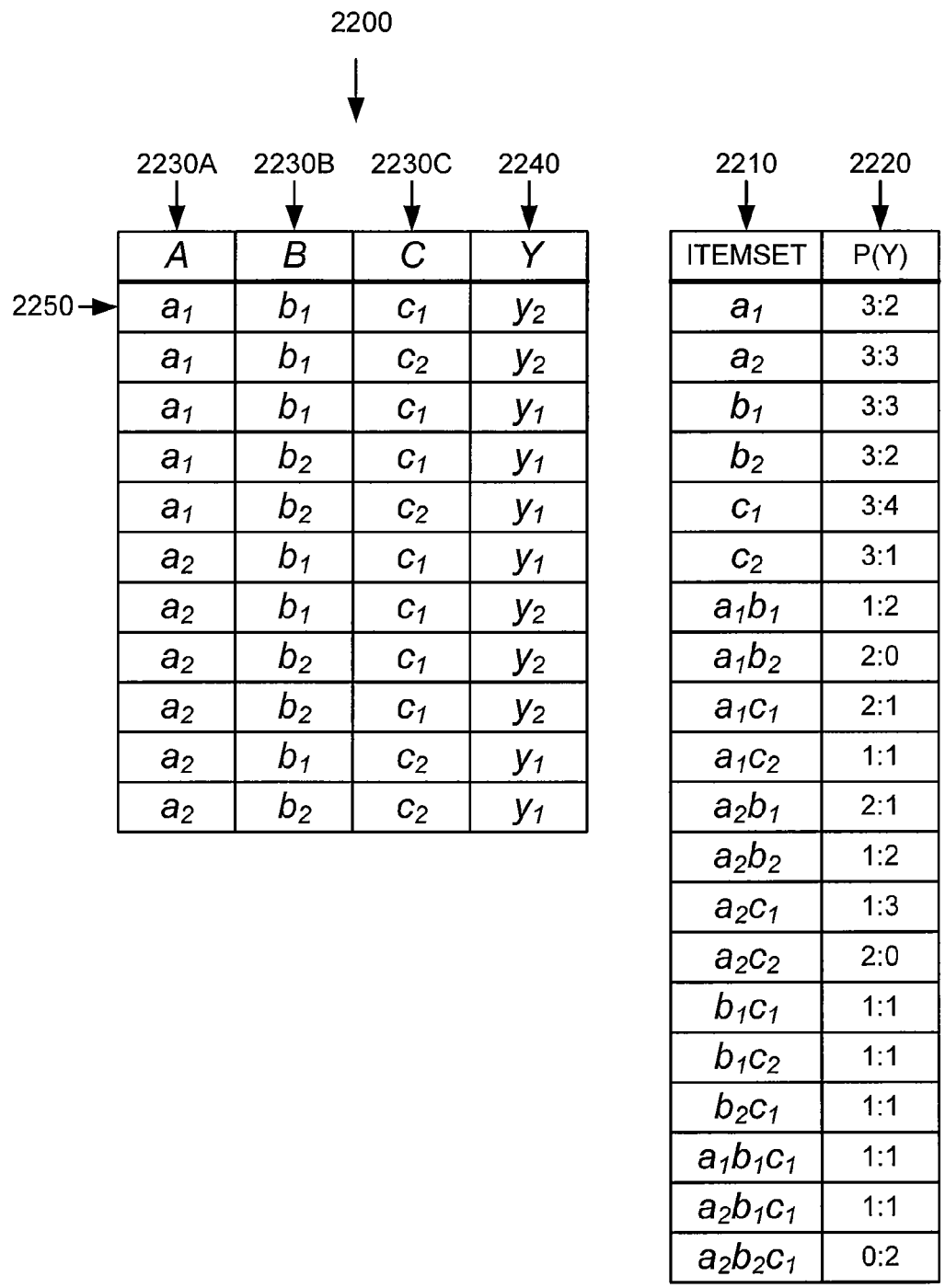
FIG. 22 depicts an exemplary dataset and a corresponding set of mined frequent predictive itemsets.

An exemplary implementation of the technologies described herein is applied to the training dataset 2200 in FIG. 22. The dataset 2200 comprises eleven transactions 2250. The transactions 2250 have one value for three predictor attributes 2230 and a predicted attribute 2240. The three predictor attributes A, B and C have the value-domain $(a_1, a_2)$, $(b_1, b_2)$ and $(c_1, c_2)$ respectively. The predicted attribute Y can take the values $(y_1, y_2)$. The frequent predictive itemsets 2210 are the predictive itemsets mined from the dataset 2200 having a support threshold of two.

FIG. 23 depicts the storage of three frequent predictive itemsets from the itemsets 2210 in a frequent predictive itemset tree 2300 as described herein with an attribute order of (A, B, C). The frequent predictive itemset tree 2300 can begin as a tree consisting of an empty root node 2310 as depicted in FIG. 23A.

FIG. 23B depicts the tree 2300 after storage of a first frequent itemset $(a_1)$. First, the root node 2310 is selected. Because there is no child node of the root node 2310 having a label that matches the item $a_1$ (e.g., the first item of itemset $(a_1,)$), a node 2320 is created having a label $a_1$. Because there is only one item in the itemset $(a_1)$, the storage of itemset $(a_1)$ is complete with the node 2320 representing the frequent predictive itemset $(a_1)$. The class distribution values for itemset $(a_1)$ can be stored in the node 2320 but can also be stored in another manner as described herein.

FIG. 23C depicts the tree 2300 after storage of a second itemset $(a_1, b_1)$. The itemset $(a_1, b_1)$ is stored by first selecting the root node 2310. Because the node 2320 has a label that matches the first item, $a_1$, of itemset $(a_1, b_1)$, the node 2320 is selected. The next item in the itemset $(a_1, b_1)$, $b_1$, is then selected. Because no child of the node 2320 has a label $b_1$, a node 2330 is created having the label $b_1$. Alternatively, and as shown in FIG. 23C the node 2320 can have the label $a_1b_1$, the concatenation of the items in the itemset having been processed up to this point during storing of itemset $(a_1, b_1)$. Because $b_1$ is the last item in itemset $(a_1, b_1)$, the storage of itemset $(a_1, b_1)$ is complete and is represented by the node 2330.

Figure 24:
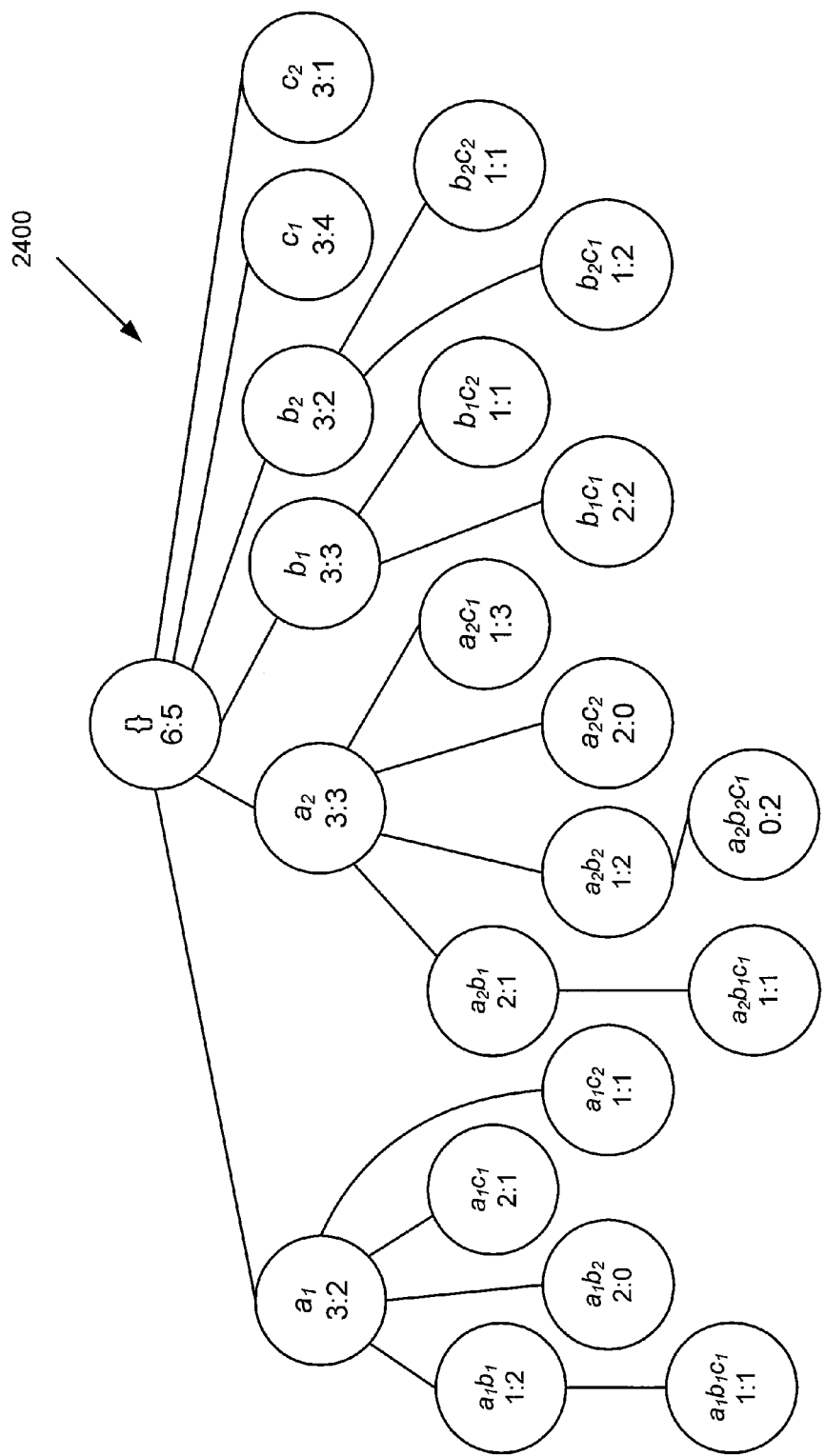
FIG. 24 shows a frequent predictive itemsets tree data structure storing the frequent predictive itemsets of FIG. 22.

In a similar manner, a third itemset $(a_1, c_1)$ is stored, resulting in the tree 2300 of FIG. 23D with the storage algorithm creating a node 2340 to represent the itemset $(a_1, c_1)$. FIG. 24 shows a frequent predictive itemset tree 2400 in which the frequent predictive itemsets mined from dataset 2200 are stored and organized. The tree 2400 is a hierarchical data structure with frequent predictive itemsets having fewer items stored at upper levels of the tree and frequent predictive itemsets with more items stored at the lower levels.

A tree storing frequent itemsets according to an attribute order will have the trait that nodes corresponding to itemsets with a last item that is higher in the order (e.g., in the example, items with values for attribute A have a higher order than items with values for attribute C), will tend to have more child nodes than nodes corresponding to itemsets with a last time that is lower in the order. For example, in the tree 2400, nodes $a_1$ and $a_2$ have four children and nodes $c_1$ and $c_2$ have no children. This is because frequent itemsets that are subsets of more than one other frequent itemset will be child nodes of the frequent itemset with a last item having a higher order. For example, itemset $(a_1, c_1)$ is a subset of both itemsets $(a_1)$ and $(c_1)$. Because attribute A is higher in the order than attribute C, itemset $(a_1, c_1)$ is stored in the tree 2400 as a child of $a_1$. Itemset $(a_1, c_1)$ retains an uncle-nephew relationship with itemset $c_1$ and will be considered an immediate superset of $c_1$ for the purposes of determining best attribute splits and choosing nodes for inclusion in decision tree.

Thus, tree 2400 can be used as shorthand for a full tree, in which all superset-subset relation between frequent predictive itemsets are represented by a parent-child relationship.

Example 35

Exemplary Implementation: Calculating Best Attribute Splits

The exemplary implementation calculates best attribute splits of frequent predictive itemsets in the frequent predictive itemset tree 2500 in a bottom-up fashion. It processes nodes at the lower levels of the tree 2500 prior to processing the higher levels. The algorithm comprises determining for the nodes in the tree 2500 the best attribute split that yields the highest accuracy for the given classification task. For example, consider the frequent predictive itemset ($a_1$) represented by a node 2530, which has the immediate supersets ($a_1$, $b_1$), ($a_1$, $b_2$), ($a_1$, $c_1$) and ($a_1$, $c_2$) represented by child nodes 2510, 2540, 2550 and 2560 respectively. The supersets ($a_1$, $b_1$), ($a_1$, $b_2$) can be treated as an outcome of a split on the attribute B and ($a_1$, $c_1$), ($a_1$, $c_2$) as an outcome of a split on attribute C. Note that none of the four nodes 2510, 2540, 2550 and 2560 can be further split and classification at any of these nodes is done by assigning the transaction to the predicted attribute value with the highest probability at that node. Thus, the accuracy at node 2510 is 0.67.

The accuracy of the split on B at node 2530 can be calculated as:

$$A(B; a_1) = \frac{s(a_1, b_1)}{s(a_1)} \cdot A(a_1, b_1) + \frac{s(a_1, b_2)}{s(a_1)} \cdot A(a_1, b_2)$$
$$= \frac{3}{5} \cdot \frac{2}{3} + \frac{2}{5} \cdot \frac{2}{2}$$
$$= 0.8,$$

where s(itemset) is the support of itemset. In a similar manner, the accuracy of splitting on C at $a_1$ is calculated to be 0.6. Because splitting on B at node 2530 is more accurate than splitting on A at node 2530, the values B and 0.8 are stored at node 2530; B is the best attribute split at node 2530 and 0.8 is the best attribute split accuracy.

For example showing the inclusion of nephew nodes in the accuracy calculation, consider the frequent itemset ($b_1$) represented by a node 2590, which has the immediate supersets ($b_1$, $c_1$), ($b_1$, $C_2$), ($a_1$, $b_1$) and ($a_2$, $b_1$) represented by child nodes 2592 and 2594 and nephew nodes 2510 and 2596 respectively. The supersets ($b_1$, $c_1$) and ($b_1$, $c_2$) are treated as an outcome of a split on attribute C and the supersets ($a_1$, $b_1$) and ($a_2$, $b_1$) can be treated as an outcome of a split on attribute A. Following the same accuracy calculation algorithm, either attribute could be considered the best attribute split as they both have an accuracy of 0.67.

In order to process a node, its immediate subsets should already be processed. For example, before processing a root node 2520, nodes 2570 representing frequent predictive itemsets ($a_1$), ($a_2$), ($b_1$), ($b_2$), ($c_1$) and ($c_2$) should have already been processed so that from the best accuracies of these nodes, the best attribute split for the root node 2520 can be determined. The frequent predictive itemset tree organizes the frequent predictive itemsets in such a way that by traversing the tree in a Left-Right-Root fashion the superset itemsets of any node are processed before this node. This owes to the storing the frequent itemsets according to an attribute order; all nephew nodes having a subset relationship with a node to be processed are child nodes of sibling nodes to the left of the node to be processed. This allows a bottom-up algorithm to determine the best attribute splits for the tree in one pass. The tree 2500 shows the best attribute splits determined for the frequent predictive itemset tree 2400. In addition to the node 2530, the nodes 2520 and 2580 have best attribute splits as they have a plurality of attributes associated with them (e.g., node 2520 has splits on attribute A, B and C and node 2580 has splits on attribute B and C).

Example 36

Exemplary Pseudocode for Calculating Best Attribute Splits

Figure 25:
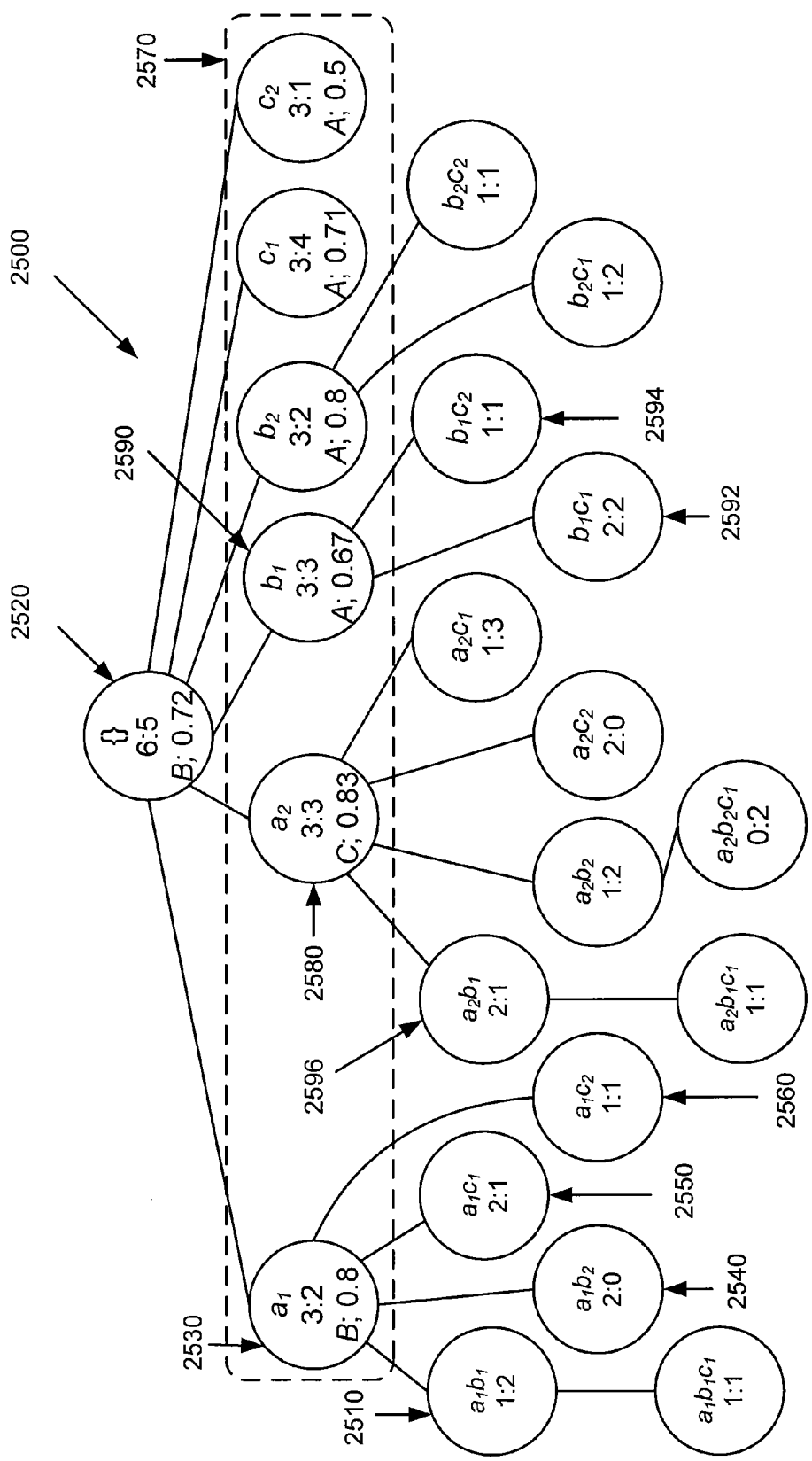
FIG. 25 is a frequent predictive itemset tree data structure having determined best attribute splits.

The exemplary pseudocode in Table 2600 of FIG. 26 shows the algorithm Find-BestSplits that finds the best split for the nodes of a frequent predictive itemset tree. When the first call is made to this algorithm, Node is the root of the tree and 1 mm-Supersets contains the children of the root. Lines 3-10 show the first phase of the algorithm, which traverses the sub-tree rooted at Node in a Left-Right-Root fashion. The for-loop in line-3 accesses children of Node from left to right and the child's immediate supersets are computed in lines 5-9. The child.item in line 6 is the item added to child's parent to obtain child. For example, in FIG. 25, $b_1$ is the item of the node 2510 since this is the item that is added to itemset of its parent, the node 2530, to make the itemset $a_1 b_1$. Lines 5-7 expand the immediate supersets of Node using child.item and includes any valid expansion in the set Child-Supersets. Lines 8-9 include the children of child in this set, as none of them will be included by the for-loop in lines 5-7 because child.item is not the right-most item in these children. That is, lines 5-7 collect the nephews of child that are supersets of child and lines 8-9 collect the children of child. In the second phase of the algorithm (lines 11-13), the best split at Node is calculated from the accuracies of its immediate supersets.

Example 37

Exemplary Implementation: Decision Tree Construction

Figure 27:
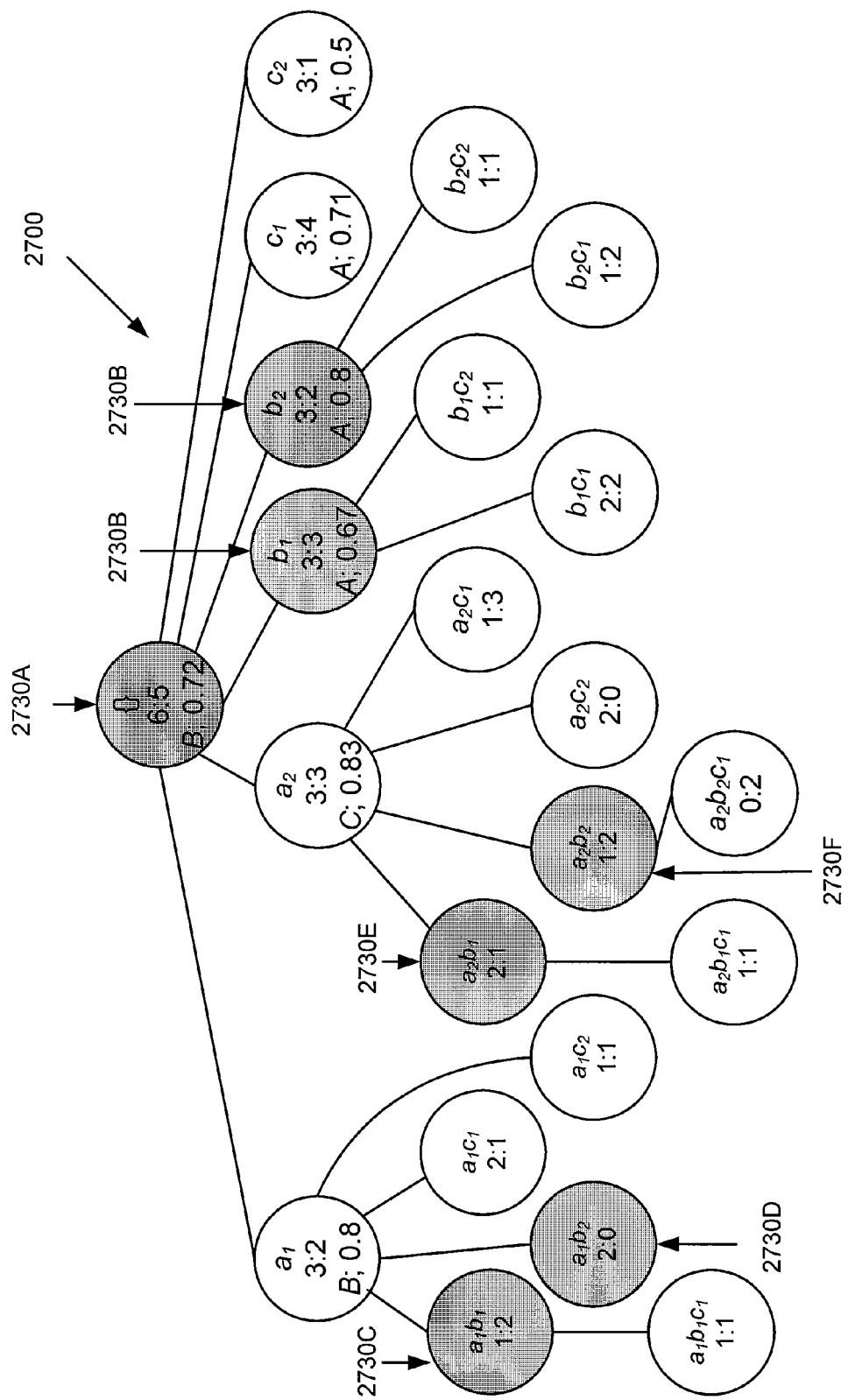
FIG. 27 is a frequent predictive itemsets tree data structure with nodes chosen for constructing a decision tree using the exemplary method of FIG. 14.

In the exemplary implementation, a decision tree is constructed from the best attribute splits calculated for the frequent predictive itemsets 2210 stored in the frequent predictive itemset tree 2500. FIG. 27 shows a tree 2700 representing the frequent predictive itemsets 2210 in which nodes 2730 chosen for inclusion in a decision tree are highlighted. The chosen nodes 2730 comprise the nodes encountered while traversing best-attribute-split paths of the tree 2700 (e.g., following best attribute splits, regardless of whether there is a direct path). For example, the nodes 2730B and 2730C are chosen because they are associated with attribute split B which matches the best attribute split, the root node 2720. Similarly, the nodes 2730C-2730F are chosen because they are associated with attribute split B, the best attribute splits of the nodes 2730B and 2730C.

Figure 28:
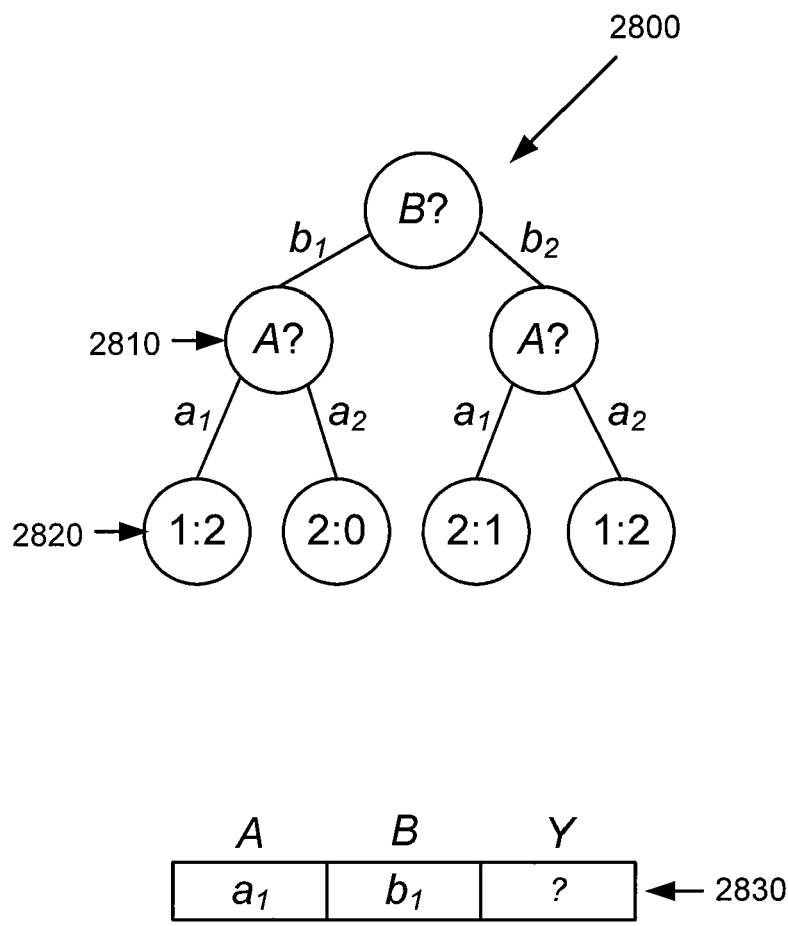
FIG. 28 is a decision tree constructed using the exemplary method of FIG. 14.

FIG. 28 shows a decision tree 2800 generated from (e.g., based on) the chosen nodes 2730. The nodes of the decision tree 2800 correspond to the respective chosen nodes 2730. The chosen nodes 2730 not having an attribute split (e.g., the nodes 2730D-2730G) correspond to leaf nodes in the decision tree. The chosen nodes 2730 having attribute splits (e.g., the nodes 2730A-2730C) correspond to internal nodes in the decision tree 2800 and indicate an attribute split on which a decision is to be made. For example, a node 2730C having a best attribute split B has a corresponding node 2810 indicating a decision to be made based on the value of attribute B.

The decision tree 2800 generated by the exemplary implementation can be used to classify the value of predicted attribute Y for an unclassified transaction. For example, applying the decision tree 2800 to an unclassified transaction 2830 having values $a_1$ and $b_1$ for predictor attributes A and B results in a prediction of $y_2$ for the value of predicted attribute Y (e.g., $y_2$ was the predicted attribute value most frequently encountered in transactions containing $a_1$ and $b_1$ in the dataset 2200). Alternatively, the decision tree could predict that the predicted attribute of the transaction 2830 has a 33% likelihood of having the value $y_1$ and a 67% likelihood of having the value $y_2$.

Example 38

Exemplary System for Constructing a Decision Tree

Figure 29:
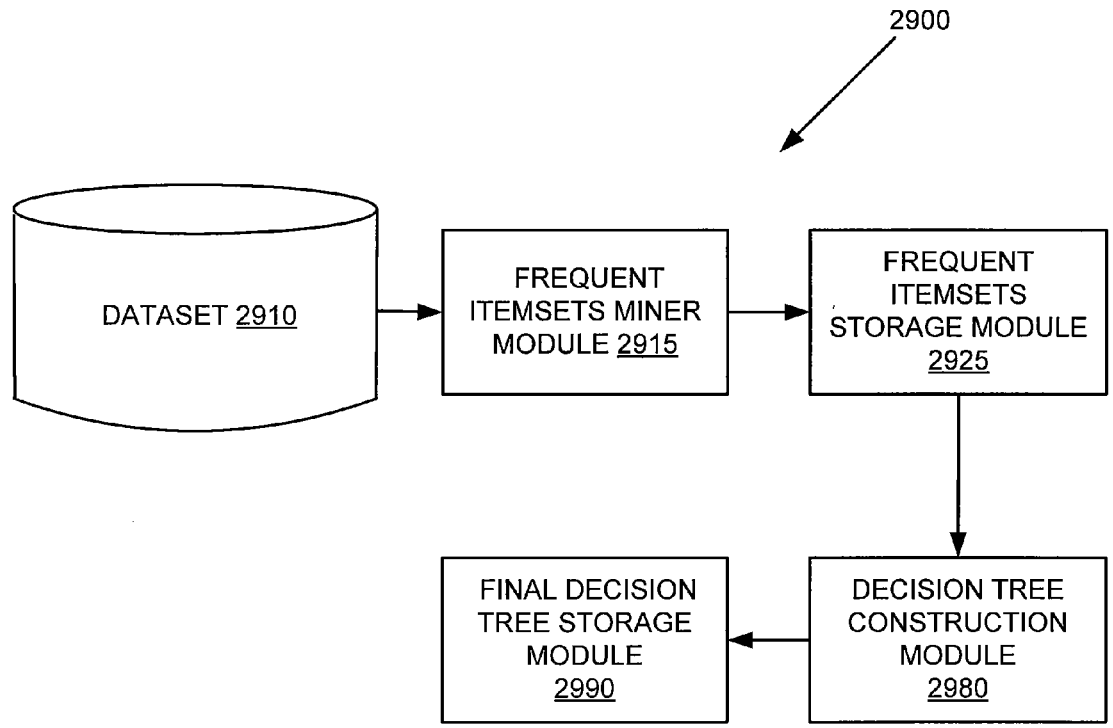
FIG. 29 is a block diagram of an exemplary system for constructing a decision tree from frequent itemsets.

FIG. 29 is a block diagram depicting a complete architecture of the decision tree construction system 2900, in accordance with an aspect of the present technique. The system 2900 comprises a dataset 2910, a frequent itemsets miner module 2915, a frequent itemsets storage module 2925, a decision tree construction module 2980 and a final decision tree storage module 2990.

The frequent itemsets miner module 2915, receives the dataset 2910 as input. The module 2915 mines the frequent itemsets for a given support threshold measure without considering the class attribute of the records Multiple data mining tasks may be performed to mine frequent itemsets from the data 2910. The module 2915 may comprise the data mining tasks.

The frequent itemsets storage module 2925 holds the frequent itemsets generated from the module 2915 The module 2925 may be storing the mined frequent itemsets that may be used for building the decision tree. The final decision tree storage module 2990 stores the constructed decision tree.

Example 39

Exemplary System for Construction a Decision Tree from Frequent Itemsets

Figure 30:
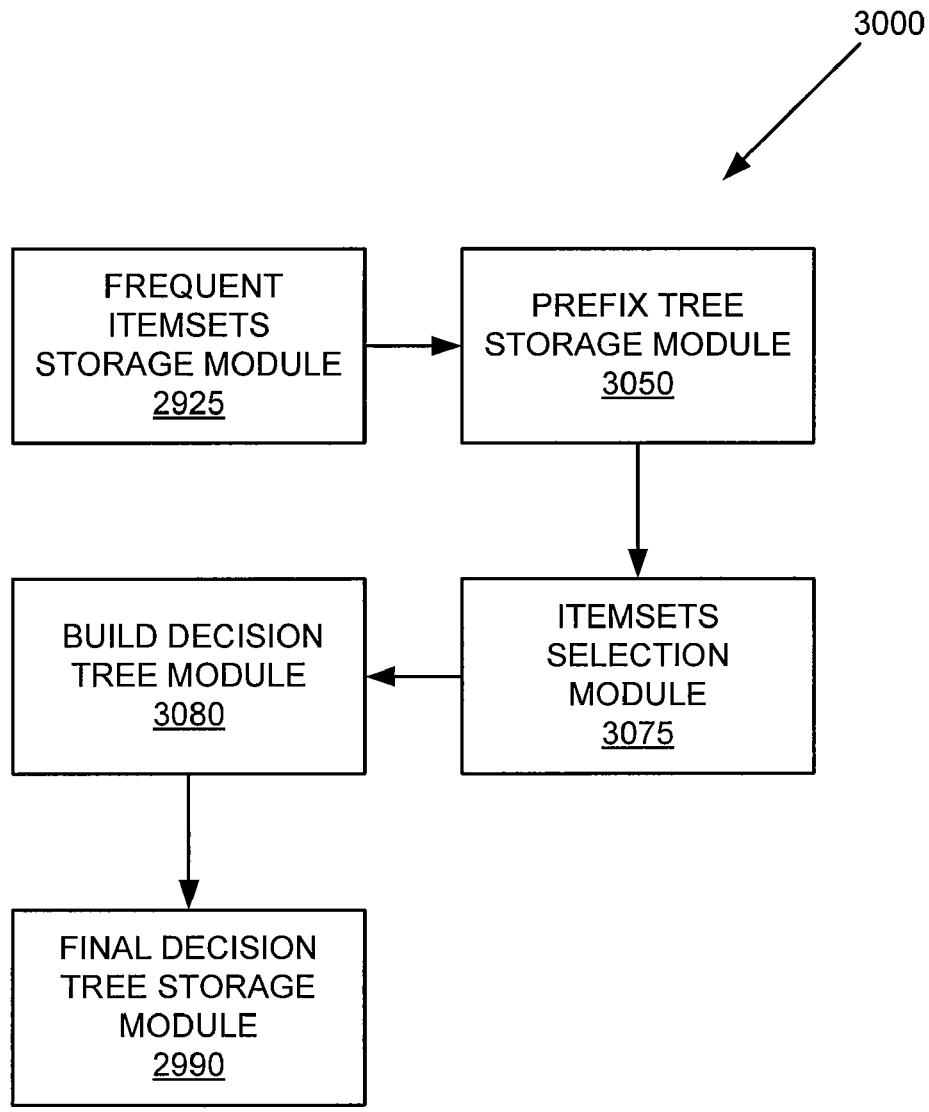
FIG. 30 is a block diagram of an exemplary system for constructing a decision tree from frequent itemsets.

FIG. 30 is a block diagram depicting one or more stages for building the decision tree system 3000, in accordance with an aspect of the present technique. The system 3000 may describe the module 2980. The diagram 3000 comprises the frequent itemsets storage module 2925, a prefix tree storage module 3050, an itemsets selection module 3075, a build decision tree module 3080 and the final decision tree storage module 2990.

The frequent itemsets storage module 2925 holds the frequent itemsets. The prefix tree storage module 3050 receives the frequent itemsets as input. The frequent itemsets may be stored in a prefix tree form. In addition, for nodes (e.g., each node) of the prefix tree that represents a frequent itemset, the class distribution values may be computed and stored at that node. It should be noted that a prefix tree may be a tree structure wherein the words (e.g., all of the words) likely to be encountered by the system 3000 are represented in the tree structure.

The itemsets selection module 3075 processes the prefix tree and chooses a subset of frequent itemsets that may be mutually exclusive, collectively exhaustive and highly accurate. In addition, the chosen frequent itemsets and their relevant class distribution values may be the input into the next module.

The build decision tree module 3080 builds the decision tree from the chosen frequent itemsets. The final decision tree storage module 2990 stores the constructed decision tree.

Example 40

Exemplary System for Calculating Best Splits

Figure 31:
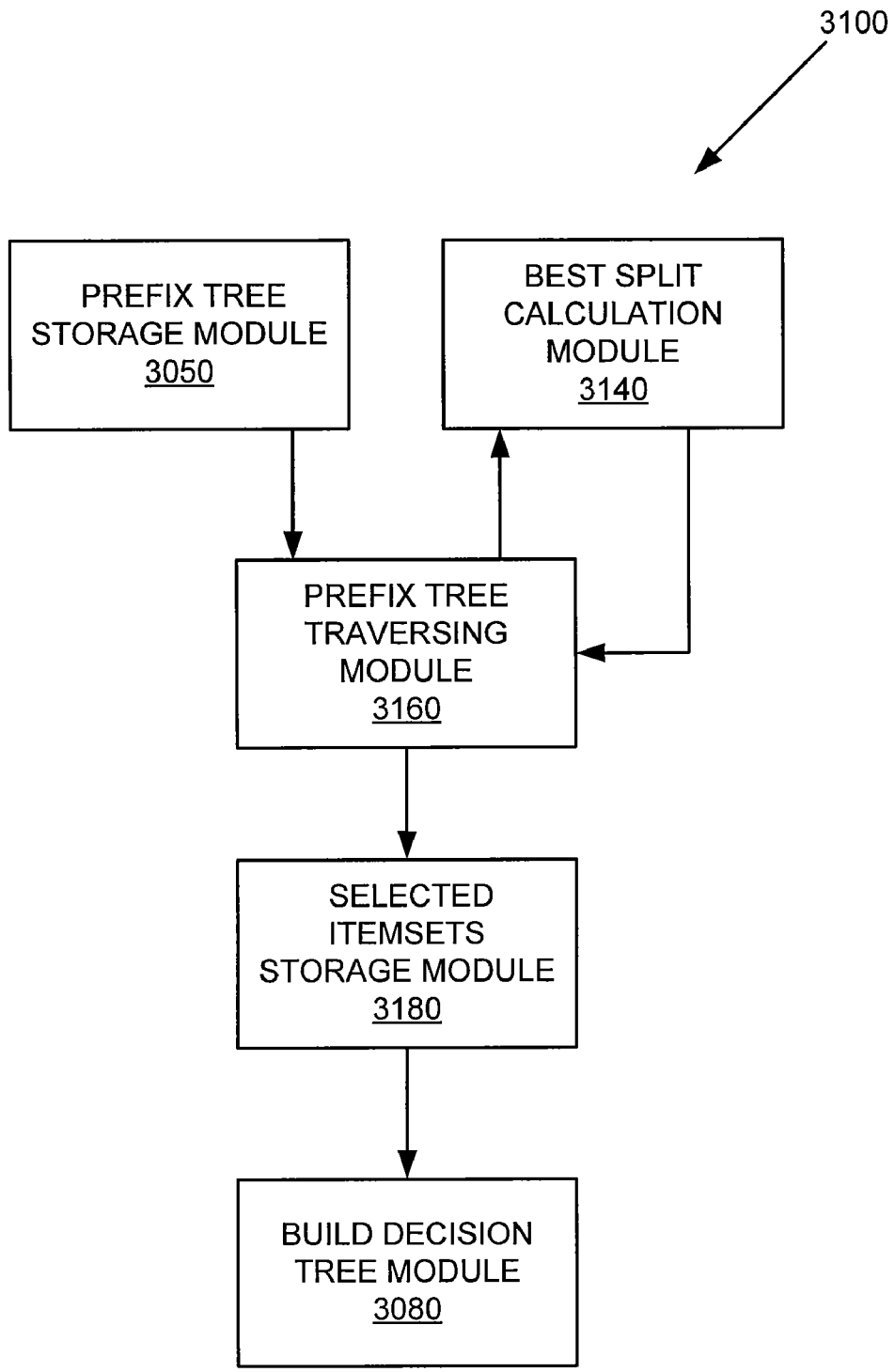
FIG. 31 is a block diagram of an exemplary system for calculating best splits.

FIG. 31 is a block diagram depicting a process for calculating the best split for the decision tree construction system 3100, in accordance with an aspect of the present technique. The system 3100 comprises the prefix tree storage module 3050, a best split calculation module 3140, a prefix tree traversing module 3160, a selected itemsets storage module 3180 and the build decision tree module 2980.

The prefix tree storage module 2950 stores the frequent itemsets and gives the resultant prefix tree obtained as input to the prefix tree traversing module 3160. The prefix tree traversing module 3160 receives the input as the prefix tree obtained from the module 2950. In addition, the module 3160 traverses the tree and finds the best split attribute at nodes (e.g., each node) using the best split calculation module 3140. It should be noted that in this case, a bottom-up traversal that may be a depth first traversal is used. Furthermore, the module 3160 may traverse the tree repeatedly starting from the root node following the best splits and may collect the leaf level frequent itemsets (e.g., all the leaf level frequent itemsets), after which traversal is not possible. The chosen frequent itemsets may be the input to the next module.

The best split calculation module 3140 determines the best split attribute at the given node. The determination may be done by finding out the immediate supersets of the node, grouping them into sub-groups based on the attribute split that may have generated them from the current node, calculating the accuracy for reach of these attribute splits, and choosing and storing the attribute split with the highest accuracy (which is the best-split) at the node.

Example 41

Exemplary Method of Calculating Best Splits

Figure 32:
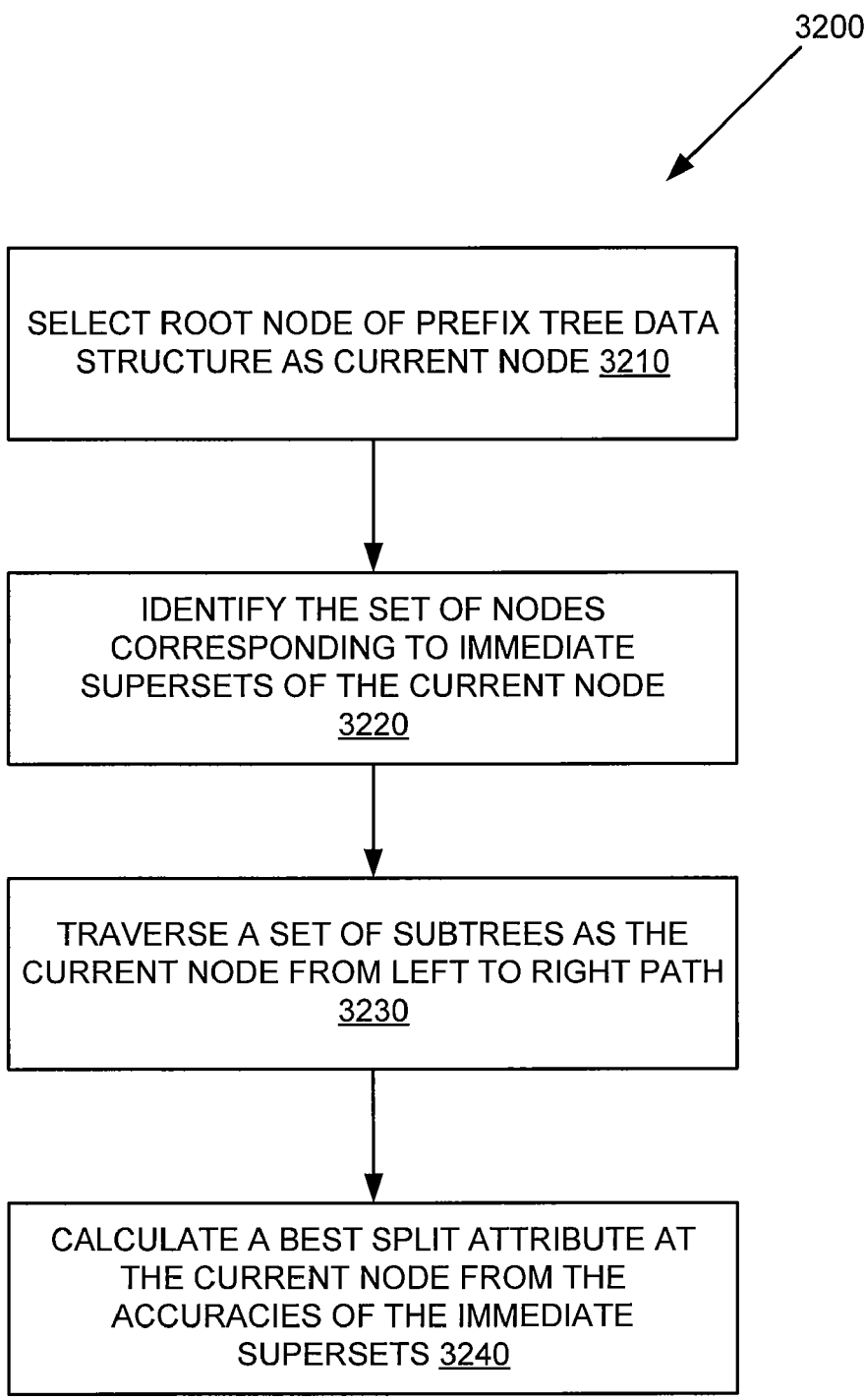
FIG. 32 is a flowchart of an exemplary method of calculating best splits.

FIG. 32 is a flow diagram indicative of a process of a decision tree construction system 3200, in accordance with an aspect of the present technique.

The method continues at step 3210, wherein a root of a prefix tree data structure may be taken initially as a current node. The method continues at 3220, wherein the set of nodes corresponding to immediate supersets of the current may be identified. It should be noted that 3210 to 3240 may be repeated for sub-trees (e.g., each sub-tree) with a condition that if any sub-tree consists of a single node then 3210 to 3240 may not be repeated for that particular sub-tree. It should also be noted that this accuracy may be used while calculating the best split attribute using best split calculation module at the parent node of the current node.

The method continues at 3230, wherein a set of sub-trees at the current node may be traversed from left to right path. During the first phase of the best split calculation module children of current node from left to right path and each child's immediate superset may be computed by traversing the sub-tree in a bottom-up or depth-first path that may be rooted at current node. In these cases, the items of the child may be added to the child's parent to obtain the resultant child. Furthermore, immediate supersets of the node (e.g., each immediate superset of the node) using the items of the child may be expanded.

Furthermore, the method ends at 3240, wherein a best split attribute at the current node may be calculated from the accuracies of the immediate supersets. During the second phase of the best split calculation module the best split attribute at nodes (e.g., each node) may be computed and stored in their respective nodes.

Example 42

Exemplary Advantages

Using the technologies described herein, it is possible to generate decision trees having greater accuracy than conventional techniques. For example, conventional greedy techniques can fail to choose attribute splits discovered by the technologies described herein, leading to a less accurate decision tree.

Example 43

Exemplary Computing Environment

Figure 33:
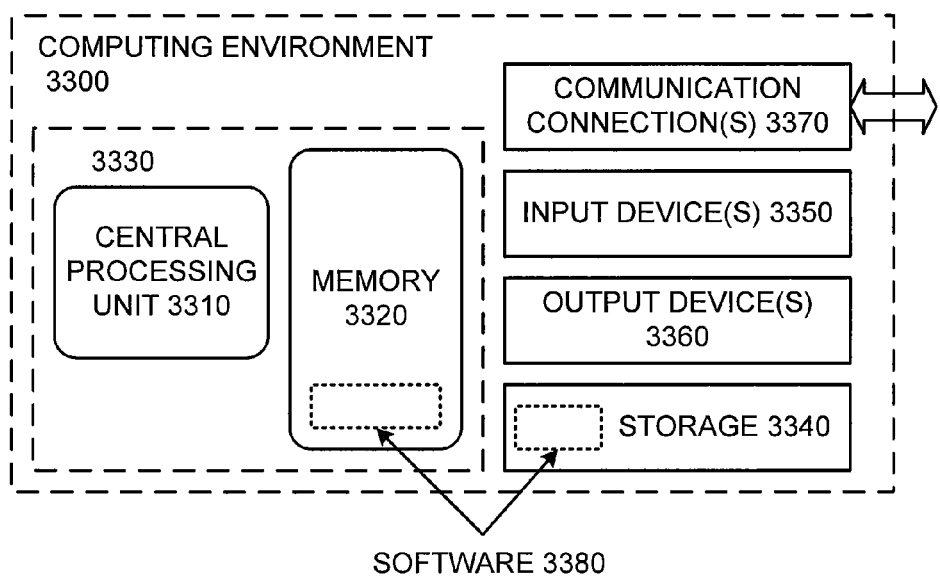
FIG. 33 is a block diagram of an exemplary suitable computing environment for implementing any of the technologies described herein.

FIG. 33 illustrates a generalized example of a suitable computing environment 3300 in which the described techniques can be implemented. The computing environment 3300 is not intended to suggest any limitation as to scope of use or functionality, as the technologies may be implemented in diverse general-purpose or special-purpose computing environments. A mainframe environment will be different from that shown, but can also implement the technologies and can also have computer-readable media, one or more processors, and the like.

With reference to FIG. 33, the computing environment 3300 includes at least one processing unit 3310 and memory 3320. In FIG. 33, this basic configuration 3330 is included within a dashed line. The processing unit 3310 executes computer-executable instructions and may be a real or a virtual processor. In a multi-processing system, multiple processing units execute computer-executable instructions to increase processing power. The memory 3320 may be volatile memory (e.g., registers, cache, RAM), non-volatile memory (e.g., ROM, EEPROM, flash memory, etc.), or some combination of the two. The memory 3320 can store software 3380 implementing any of the technologies described herein.

A computing environment may have additional features. For example, the computing environment 3300 includes storage 3340, one or more input devices 3350, one or more output devices 3360, and one or more communication connections 3370. An interconnection mechanism (not shown) such as a bus, controller, or network interconnects the components of the computing environment 3300. Typically, operating system software (not shown) provides an operating environment for other software executing in the computing environment 3300, and coordinates activities of the components of the computing environment 3300.

The storage 3340 may be removable or non-removable, and includes magnetic disks, magnetic tapes or cassettes, CD-ROMs, CD-RWs, DVDs, or any other computer-readable media which can be used to store information and which can be accessed within the computing environment 3300. The storage 3340 can store software 3380 containing instructions for any of the technologies described herein.

The input device(s) 3350 may be a touch input device such as a keyboard, mouse, pen, or trackball, a voice input device, a scanning device, or another device that provides input to the computing environment 3300. For audio, the input device(s) 3350 may be a sound card or similar device that accepts audio input in analog or digital form, or a CD-ROM reader that provides audio samples to the computing environment. The output device(s) 3360 may be a display, printer, speaker, CD-writer, or another device that provides output from the computing environment 3300.

The communication connection(s) 3370 enable communication over a communication medium to another computing entity. The communication medium conveys information such as computer-executable instructions, audio/video or other media information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Communication media can embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. Communication media include wired media such as a wired network or direct-wired connection, and wireless media such as acoustic, RF, infrared and other wireless media. Combinations of any of the above can also be included within the scope of computer-readable media.

The techniques herein can be described in the general context of computer-executable instructions, such as those included in program modules, being executed in a computing environment on a target real or virtual processor. Generally, program modules include routines, programs, libraries, objects, classes, components, data structures, etc., that perform particular tasks or implement particular abstract data types. The functionality of the program modules may be combined or split between program modules as desired in various embodiments. Computer-executable instructions for program modules may be executed within a local or distributed computing environment.

Methods in Computer-Readable Media

Any of the methods described herein can be implemented by computer-executable instructions in one or more computer-readable media (e.g., computer-readable storage media or other tangible media). Such instructions can cause a computer to perform the described method. The technologies described herein can be implemented in a variety of programming languages.

Alternatives

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the following claims. I therefore claim as my invention all that comes within the scope and spirit of these claims.

I claim:

1. A computer-implemented method of constructing a decision tree generating a prediction for a predicted attribute of a transaction, the method comprising:

mining a plurality of frequent predictive itemsets from a training dataset, the plurality of frequent predictive itemsets comprising values for one or more predictor attributes;

storing the plurality of frequent predictive itemsets in a hierarchical frequent predictive itemset tree data structure, wherein child nodes of the hierarchical frequent predictive itemset tree data structure represent one of the plurality of frequent predictive itemsets that is a superset of an immediate parent node of the respective child node;

determining best attribute splits for respective of the plurality of frequent predictive itemsets; and constructing the decision tree, wherein the constructing comprises generating nodes for inclusion in the decision tree based on the plurality of frequent predictive itemsets according to the best attribute splits for the plurality of frequent predictive itemsets, the generating comprising:

choosing nodes of one or more best attribute split paths of the hierarchical frequent predictive itemset tree data structure; and for the chosen nodes, generating corresponding decision nodes in the decision tree, the generated decision nodes associated with one of the one or more predictor attributes; and whereby respective of the decision nodes of a path of the decision tree consisting of one or more of the nodes corresponding to one or more of the chosen nodes is associated with a predictor attribute that is different from the one or more predictor attributes associated with other decision nodes in the path.

2. The method of claim 1, wherein:
determining best attribute splits comprises traversing the hierarchical frequent predictive itemset tree data structure in a bottom-up fashion.

3. The method of claim 2, wherein traversing the hierarchical frequent predictive itemset tree data structure in a bottom-up fashion comprises:
choosing a best attribute split out a plurality of possible attribute splits based on accuracies stored at immediate superset nodes in the hierarchical frequent predictive itemset tree data structure.

4. The method of claim 2, wherein traversing the hierarchical frequent predictive itemset tree data structure in a bottom-up fashion comprises:
deferring calculation of accuracy for a present node;
calculating accuracy for immediate superset nodes of the present node; and
after calculating accuracy for immediate superset nodes of the present node, calculating accuracy for the present node.

5. The method of claim 1 wherein:
determining best attribute splits for the plurality of frequent predictive itemsets comprises calculating accuracies for attribute splits at lower levels of the hierarchical frequent predictive itemsets tree data structure before calculating accuracies for attribute splits at higher levels of the hierarchical frequent predictive itemsets tree data structure.

6. The method of claim 1, wherein determining best attribute splits comprises:
for frequent predictive itemsets having a set of items that is a subset of the set of items of at least one other frequent predictive itemset, determining respective best attribute splits.

7. The method of claim 1, wherein determining best attribute splits comprises:
for the frequent predictive itemsets, calculating respective class distribution values indicative of a distribution of values for one or more of the one or more predictor attributes.

8. The method of claim 1, wherein the mining comprises:
selecting predictive itemsets from the training dataset, the predictive itemsets comprising values for the one or more predictor attributes;
calculating, for the predictive itemsets, respective support values; and
identifying the predictive itemsets having respective support values greater than a support threshold value as frequent predictive itemsets.

9. The method of claim 8 further comprising:
for the frequent predictive itemsets, calculating respective pluralities of class distribution values;
wherein the internal nodes and the leaf nodes of the hierarchical frequent predictive itemset tree data structure have respective labels; and
storing the frequent predictive itemsets comprises:
i) creating a sequence, the sequence containing the set of items of one frequent predictive itemset, the sequence items ordered according to an attribute order; and
ii) storing the sequence in the tree data structure, the storing comprising:
a) setting a current node to a root node of the tree data structure;
b) setting a current item to a first item of the sequence;
c) if no label of an existing child node of the current node matches the current item, creating a new child node of the current node, the label of the new child node being set to the current item;
d) setting the current node to the child node of the current node whose label matches the current item;
e) setting the current item to a next item in the sequence, the current item indicating that the end of the sequence has been reached if there is no next item in the sequence;
iteratively repeating c) through e) until the current item indicates that the end of the sequence has been reached; and
storing a plurality of class distribution values for the one frequent predictive itemset at the current node; and
iteratively repeating i) through ii) until the frequent predictive itemsets are stored in the tree data structure.

10. The method of claim 9, wherein:
one or more internal nodes have a respective plurality of attribute splits, the attribute splits associated with respective predictor attributes;
immediate superset nodes of the one or more internal nodes are respectively associated with one of the respective attribute splits of the one or more internal nodes; and
determining respective best attribute splits comprises:
a) calculating accuracies for the plurality of attribute splits of one of the one or more internal nodes, the accuracies based on the plurality of class distribution values stored at the one of the one or more internal nodes and the plurality of class distribution values and accuracies stored at immediate superset nodes of the one of the one or more internal nodes associated with the respective attribute splits;
b) selecting a best attribute split from the plurality of attribute splits of the one of the one or more internal nodes, the best attribute split having the greatest accuracy among the plurality of attribute splits;

c) storing at the one of the one or more internal nodes the best attribute split and the accuracy of the best attribute split; and d) iteratively repeating a) through c) until the best attribute splits are determined for the one of the one or more internal nodes having a plurality of attribute splits;

wherein the hierarchical frequent predictive itemset tree data structure is traversed in a depth-first manner, whereby the accuracies stored at immediate superset nodes of the one or more internal nodes are calculated prior to calculating the respective best attribute split for the one or more internal nodes; and wherein accuracy stored at an immediate superset node is based on a plurality of class distribution values when the immediate superset node is also a leaf node.

11. The method of claim 10, wherein the tree data structure is traversed in a depth-first left-right manner, whereby the one or more internal nodes at the same level of the tree data structure are processed in an order according to the attribute order.

12. The method of claim 9, wherein generating nodes for inclusion in the decision tree further comprises:

choosing the frequent predictive itemset tree root node; and choosing nodes of one or more best-attribute-split paths of the hierarchical frequent predictive itemset tree data structure comprises choosing nodes of the frequent predictive itemset tree data structure that are immediate superset nodes associated with an attribute split that is the best attribute of one or more internal nodes at one level above the immediate superset nodes; and wherein the generating corresponding decision nodes in the decision tree comprises generating corresponding decision nodes having child nodes corresponding to chosen immediate superset nodes in the frequent predictive itemset tree of the chosen nodes.

13. The method of claim 1, wherein the prediction is made by traversing the decision tree, the traversing comprising:

starting at a decision tree root node;

traversing the decision tree based on predictor attribute values; and arriving at a decision tree leaf node.

14. The method of claim 13, wherein the prediction comprises the class distribution value stored at the decision tree leaf node having the greatest frequency among the plurality of class distribution values.

15. The method of claim 1 wherein choosing the nodes comprises exhaustively traversing the best attribute splits paths of the frequent predictive itemset tree.

16. The method of claim 1, whereby the depth of the hierarchical frequent predictive itemset tree data structure is equal to or less than the number of the predictor attributes.

17. A computer-implemented method of constructing a decision tree generating a prediction for a predicted attribute of a transaction, the method comprising:

selecting predictive itemsets from a dataset, the predictive itemsets comprising respective values for the one or more predictor attributes;

calculating, for the predictive itemsets, respective support values;

identifying the predictive itemsets having respective support values greater than a support threshold value as frequent predictive itemsets;

identifying the predictive itemsets having respective support values greater than a support threshold value minus than a margin value as frequent predictive itemsets;

calculating respective class distribution values indicative of a distribution of values for the predictor attribute for the respective frequent predictive itemsets;

storing the frequent predictive itemsets in a hierarchical frequent predictive itemsets tree data structure, wherein:

internal nodes and leaf nodes have respective labels;

one or more internal nodes have a respective plurality of attribute splits, the attribute splits associated with respective predictor attributes; and immediate superset nodes of the one or more internal nodes are respectively associated with one of the respective attribute splits of the one or more internal nodes, the storing comprising:

i) creating a sequence, the sequence containing the set of items of one frequent predictive itemset, the sequence items ordered according to an attribute order; and ii) storing the sequence in the tree data structure, the storing comprising:

a) setting a current node to a root node of the tree data structure;

b) setting a current item to a first item of the sequence;

c) if no label of an existing child node of the current node matches the current item, creating a new child node of the current node, the label of the new child node being set to the current item;

d) setting the current node to the child node of the current node whose label matches the current item;

e) setting the current item to a next item in the sequence, the current item indicating that the end of the sequence has been reached if there is no next item in the sequence;

iteratively repeating c) through e) until the current item indicates that the end of the sequence has been reached; and storing a plurality of class distribution values for the one frequent predictive itemset at the current node; and iteratively repeating i) through ii) until the frequent predictive itemsets are stored in the tree data structure;

determining best attribute splits for respective of the frequent predictive itemsets, the determining comprising:

iii) calculating accuracies for the plurality of attributes splits of one of the one or more internal nodes, the accuracies based on the set of class distribution values stored at the one of the one or more internal nodes and the set of class distribution values and accuracies stored at the immediate superset nodes of the one of the one or more internal nodes associated with the respective attribute splits;

iv) choosing a best attribute split from the plurality of attribute splits of the one of the one or more internal nodes, the best attribute split having the greatest accuracy among the plurality of attribute splits;

v) storing at the one of the one or more internal nodes the best attribute split and the accuracy of the best attribute split; and vi) iteratively repeating iii) through v) until the best attribute splits are determined for the one of the one or more internal nodes having a plurality of attribute splits;

wherein the tree data structure is traversed in a depth-first manner, whereby the accuracies stored at immediate superset nodes of the one or more internal nodes are calculated prior to calculating the respective best attribute split for the one or more internal nodes; and wherein accuracy stored at an immediate superset node is based on a plurality of class distribution values when the immediate superset node is also a leaf node, choosing the frequent predictive itemset tree root node;

choosing the nodes of the frequent predictive itemset tree data structure that are immediate superset nodes associated with an attribute split that is the best attribute of one or more internal nodes at one level above the immediate superset nodes; and for the chosen nodes, generating a corresponding node in the decision tree having child nodes corresponding to chosen immediate superset nodes in the frequent predictive itemset tree data structure of the chosen nodes, the generated nodes being associated with one of the one or more predictor attributes;

whereby respective of the decision nodes of a path of the decision tree consisting of one or more of the nodes corresponding to one or more of the chosen nodes is associated with a predictor attribute that is different from the predictor attributes associated with other decision nodes in the path.

18. A general-purpose computer configured to perform a method of constructing a decision tree generating a prediction for a predicted attribute of a transaction, the method comprising:

a programming module configured to mine a plurality of frequent predictive itemsets from a training dataset, the plurality of frequent predictive itemsets comprising values for one or more predictor attributes;

a programming module configured to store the plurality of frequent predictive itemsets in a hierarchical frequent predictive itemset tree data structure, wherein child nodes of the hierarchical frequent predictive itemset tree data structure represent one of the plurality of frequent predictive itemsets that is a superset of an immediate parent node of the respective child node;

a programming module configured to determine best attribute splits for respective of the plurality of frequent predictive itemsets; and a programming module configured to construct the decision tree, wherein the constructing comprises generating nodes for inclusion in the decision tree based on the plurality of frequent predictive itemsets according to the best attribute splits for the plurality of frequent predictive itemsets, the generating comprising:

choosing nodes of one or more best attribute split paths of the hierarchical frequent predictive itemset tree data structure; and for the chosen nodes, generating corresponding decision nodes in the decision tree, the generated decision nodes associated with one of the one or more predictor attributes; and whereby respective of the decision nodes of a path of the hierarchical frequent predictive itemset tree data structure consisting of one or more of the nodes corresponding to one or more of the chosen nodes is associated with a predictor attribute that is different from the predictor attributes associated with other decision nodes in the path.

19. A hierarchical frequent predictive itemsets tree data structure encoded on one or more computer-readable storage media, the data structure comprising:

nodes representing respective frequent predictive itemsets mined from a data set, wherein best attributes splits are stored at one or more lower nodes in the tree;

wherein the nodes are arranged so that a child node of a particular node representing a particular itemset represents a superset of the particular itemset;

whereby traversal of the hierarchical frequent predictive itemsets tree data structure in a bottom-up fashion achieves determination of best attribute splits for higher nodes in the tree based on one or more of the best attribute splits stored at one or more lower nodes in the tree.

20. The hierarchical frequent predictive itemsets tree data structure of claim 19 wherein the data structure comprises:

a root node;

one or more leaf nodes; and one or more internal nodes;

the leaf nodes and child nodes have a respective label and a respective plurality of class distribution values, the plurality of class distribution values indicating the frequency with which values of the class attribute occur in the dataset;

one or more internal nodes having a respective plurality of attribute splits storing a respective accuracy and a respective best attribute split, wherein one or more immediate superset nodes of the respective one or more internal nodes are respectively associated with one of the respective attribute splits, the accuracy being accuracy of the best attribute split of the one or more internal nodes and based on a plurality of class distribution values stored at the one of the one or more internal nodes and the plurality of class distribution values and accuracies stored at the immediate superset nodes of the one of the one or more internal nodes associated with the respective attribute splits, the best attribute split being an attribute split of the internal node having highest accuracy among the attribute splits; and wherein accuracy stored at an immediate superset of an internal node is the plurality of class distribution values when the immediate superset node is also a leaf node.

21. A computer-implemented method of constructing a decision tree, the method comprising:

mining a set of frequent itemsets from a dataset to store in a prefix tree data structure;

computing and storing a set of class distribution values from the dataset at a plurality of nodes of the prefix tree data structure;

selecting a subset of the set of frequent itemsets; and constructing the decision tree using the subset of the set of frequent itemsets.

22. The method of claim 21, the method further comprising determining best splits for nodes of the prefix tree.

23. The method of claim 22, wherein determining best splits comprises:

identifying immediate supersets for respective of the nodes of the prefix tree;

grouping the immediate supersets into groups based on the attribute splits associated with the respective immediate supersets;

calculating accuracy for the groups;

selecting the attribute split associated with the group having the highest accuracy among the immediate supersets for the respective nodes; and storing information relating to the attribute split with the highest accuracy at the respective nodes.

24. The method of claim 23 wherein determining best splits is performed by traversing the prefix tree in a bottom-up fashion, the traversing comprising:

deferring calculation of accuracy for a present node;

calculating accuracy for child nodes of the present node; and after calculating accuracy for child nodes of the present node, calculating accuracy for the present node.

* * * * *

UNITED STATES PATENT AND TRADEMARK OFFICE
CERTIFICATE OF CORRECTION

| | | |
|---|---|---|
| PATENT NO. | : 7,801,924 B2 | |
| APPLICATION NO. | : 11/965692 | |
| DATED | : September 21, 2010 | |
| INVENTOR(S) | : Risi Vardhan Thonangi | |

It is certified that error appears in the above-identified patent and that said Letters Patent is hereby corrected as shown below:

Fig. 11, "PREDCTIVE" should read --PREDICTIVE--

Fig. 16, "UNHEATHLY" should read --UNHEALTHY--

Fig. 16, "HEATHLY" should read --HEALTHY--

Fig. 27, "2730A" should read --2720, 2730A--

Fig. 27, "2730B" (the one pointing to $b_2$), should read --2730C--

Fig. 27, "2730C" should read --2730G--

Column 1, line 34, "sets of item" should read --sets of items--

Column 5, line 64, "$C_9$" should read --$c_9$--

Column 6, line 36, "$C_4$" should read --$c_4$--

Column 6, line 52, "575" should read --575.--

Column 7, line 63, "$a_1$, $_{b1}$" should read --$a_1$, $b_1$--

Column 8, line 50, "(be)" should read --($b_1$)--

Column 10, line 26, "stored-in" should read --stored in--

Column 11, line 2-3, "stored the node 810." should read --stored at the node 810.--

Column 14, line 56, "exhausted" should read --been exhausted--

Column 14, line 61, "nephews" should read --nephew--

Column 17, line 3, "$C_2$" should read --$c_2$--

Column 18, line 19, "($a_1$,))" should read --($a_1$))--

Column 18, line 52, "time" should read --item--

Column 19, line 45, "$C_2$" should read --$c_2$--

Column 20, line 15-16, "1 mm-Supersets" should read --*Imm-Supersets*--

Column 20, line 52, "2730C-2730F" should read --2730D-2730G--

Signed and Sealed this
Seventeenth Day of April, 2012

David J. Kappos
*Director of the United States Patent and Trademark Office*

CERTIFICATE OF CORRECTION (continued)
U.S. Pat. No. 7,801,924 B2

Column 21, line 26, "records Multiple" should read --records. Multiple--

Column 21, line 31, "2915 The" should read --2195. The--

Column 21, line 37, "Construction a" should read --Constructing a--

Column 22, line 12, "2950" should read --3050--

Column 22, line 16, "2950" should read --3050--

Column 22, line 31, "for reach" should read --for each--

Column 25, line 40, "out a" should read --out of a--

Column 28, lines 5-6, "minus than a" should read --minus a--